United States Patent
Ko et al.

(10) Patent No.: US 10,911,291 B2
(45) Date of Patent: Feb. 2, 2021

(54) METHOD AND APPARATUS FOR TRANSMITTING AND RECEIVING DOWNLINK CHANNEL

(71) Applicant: LG Electronics Inc., Seoul (KR)

(72) Inventors: Hyunsoo Ko, Seoul (KR); Kijun Kim, Seoul (KR); Eunsun Kim, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/065,754

(22) PCT Filed: Jun. 15, 2018

(86) PCT No.: PCT/KR2018/006790
§ 371 (c)(1),
(2) Date: Jun. 22, 2018

(87) PCT Pub. No.: WO2018/231010
PCT Pub. Date: Dec. 20, 2018

(65) Prior Publication Data
US 2020/0127755 A1    Apr. 23, 2020

Related U.S. Application Data

(60) Provisional application No. 62/521,263, filed on Jun. 16, 2017, provisional application No. 62/544,212, filed on Aug. 11, 2017.

(51) Int. Cl.
*H04L 12/28* (2006.01)
*H04L 27/26* (2006.01)
(Continued)

(52) U.S. Cl.
CPC ...... *H04L 27/2666* (2013.01); *H04J 11/0069* (2013.01); *H04L 5/0007* (2013.01);
(Continued)

(58) Field of Classification Search
CPC .............. H04L 27/2655; H04L 5/0053; H04L 27/2666; H04W 56/00; H04W 48/12; H04W 72/04
(Continued)

(56) References Cited

U.S. PATENT DOCUMENTS 10,462,809 B2    10/2019  Fu et al.
10,492,157 B2    11/2019  Nam et al.
(Continued)

FOREIGN PATENT DOCUMENTS

| JP | 2014138318 | 7/2014 |
| KR | 20090107016 | 10/2009 |
| KR | 20160136219 | 11/2016 |

OTHER PUBLICATIONS

MCC Support, "Draft Report of 3GPP TSG RAN WG1 #89 v0.1.0", 3GPP TSG RAN WG1 Meeting #90, Prague, Czech Rep., Aug. 21-25, 2017, 162 pages.
(Continued)

*Primary Examiner* — John Pezzlo
(74) *Attorney, Agent, or Firm* — Fish & Richardson P.C.

(57) ABSTRACT

The present disclosure discloses a method for receiving a downlink signal by a UE in a wireless communication system. Particularly, the method may include receiving a synchronization signal block (SSB) including a primary synchronization signal (PSS), a secondary synchronization signal (SSS), and a physical broadcasting channel (PBCH), and obtaining an indicator indicating a subcarrier spacing for the downlink channel from the PBCH, and receiving the downlink signal on the basis of the subcarrier spacing. The indicator may indicate a different subcarrier spacing according to a frequency band in which the UE operates.

12 Claims, 37 Drawing Sheets

(51) Int. Cl.
　　　*H04W 48/12*　　　(2009.01)
　　　*H04W 72/04*　　　(2009.01)
　　　*H04J 11/00*　　　(2006.01)
　　　*H04W 56/00*　　　(2009.01)
　　　*H04W 48/08*　　　(2009.01)
　　　*H04L 5/00*　　　(2006.01)
　　　*H04J 1/16*　　　(2006.01)
　　　*H04W 72/12*　　　(2009.01)

(52) U.S. Cl.
　　　CPC .......... *H04L 5/0048* (2013.01); *H04L 5/0053* (2013.01); *H04L 5/0094* (2013.01); *H04L 27/2657* (2013.01); *H04W 48/08* (2013.01); *H04W 48/12* (2013.01); *H04W 56/00* (2013.01); *H04W 56/001* (2013.01); *H04W 72/04* (2013.01); *H04W 72/042* (2013.01); *H04W 72/0453* (2013.01); *H04W 72/1273* (2013.01)

(58) Field of Classification Search
　　　USPC ........................................ 370/252, 329, 503
　　　See application file for complete search history.

(56) References Cited

U.S. PATENT DOCUMENTS

| | | | |
|---|---|---|---|
| 2017/0338920 | A1 | 11/2017 | Kim et al. |
| 2018/0084593 | A1 | 3/2018 | Chen et al. |
| 2018/0124744 | A1* | 5/2018 | Xue ............. H04L 5/0094 |
| 2018/0192383 | A1 | 7/2018 | Nam et al. |
| 2018/0324689 | A1 | 11/2018 | Li et al. |
| 2019/0020517 | A1* | 1/2019 | Abedini ............ H04L 5/0048 |
| 2019/0123992 | A1* | 4/2019 | Ly ............. H04L 43/103 |
| 2019/0200307 | A1 | 6/2019 | Si et al. |
| 2019/0387485 | A1* | 12/2019 | Ko ............. H04L 5/0053 |
| 2019/0394751 | A1 | 12/2019 | Park et al. |
| 2020/0015197 | A1 | 1/2020 | Harada et al. |
| 2020/0068541 | A1 | 2/2020 | Zhang et al. |
| 2020/0092880 | A1* | 3/2020 | Choi ............. H04W 72/042 |
| 2020/0092946 | A1 | 3/2020 | Xiong et al. |
| 2020/0106510 | A1* | 4/2020 | Song ............. H04B 7/0695 |
| 2020/0187094 | A1 | 6/2020 | Horiuchi et al. |
| 2020/0187159 | A1* | 6/2020 | Ko ............. H04L 5/0051 |

OTHER PUBLICATIONS

Intel Corporation, "NR PBCH Design," 'R1-1704711', 3GPP TSG RAN WG1 MeetingRAN1 #88bis, Spokane, WA, U.S. A. Apr. 3-7, 2017, 8 pages.
ITL, "On NR PBCH Design," 'R1-1705793', 3GPP TSG RAN WG1 Meeting #88bis, Spokane, WA, USA Apr. 3-7, 2017, 9 pages.
Sequans Communications, "Discussion on NR-SSS design with radio frame boundary indication," 'R1-1707220', 3GPP TSG-Ran WG1 #89, Hangzhou, China May 15-19, 2017, 7 pages.
LG Electronics, "NR-PBCH Design," 'R1-1707590', 3GPP TSG RAN WG1 Meeting #89, Hangzhou, P.R. China May 15-19, 2017, 15 pages.
MediaTek Inc., "Disscussion on PBCH design," 'R1-1707816', 3GPP TSG RAN WG1 Meeting #89, Hangzhou, P.R. China, May 15-19, 2017, 8 pages.
Sierra Wireless, "NR PBCH Design Consideration," 'R1-1708362', 3GPP TSG RAN WG1 Meeting #89, Hangzhou, P.R. China May 15-19, 2, 4 pages.
NTT Docomo, Inc., "Discussion on SS block composition and SS burst set composition," 'R1-1708437', 3GPP TSG RAN WG1 Meeting #89, Hangzhou, P.R. China May 15-19, 2017, 6 pages.

NTT Docomo, Inc., "Discussion on system information delivery for NR," 'R1-1708440', Discussion on system information delivery for NR, Hangzhou, P.R. China May 15-19, 2017, 5 pages.
Ericsson, "SSB Time Index Indication," 'R1-1708721', 3GPP TSG-RAN WG1 Meeting #89, Hangzhou, P.R.C.,May 15-19, 2017, 4 pages.
United States Notice of Allowance in U.S. Appl. No. 16/242,560, dated May 1, 2019, 7 pages.
NTT Docomo, Inc., "WF on NR-PBCH contents and payload size," R1-1709754, 3GPP TSG RAN WG1 Meeting #89, dated May 15-19, 2017, 7 pages.
"Summary of NR-PBCH evaluation Phase 2 v1", R1-170XXX 89-15, 3GPP_TSG_RAN_WG1 Archives, dated Jun. 7 2017, retrieved from: URL<https://list.etsi.org/scripts/wa.exe?A2=ind1706A&L=3GPP_TSG_RAN_WG1&O=D&P=158472>, 13 pages.
LG Electronics, "Discussion on Initial Access Procedure," R1-1611792, 3GPP TSG RAN WG1 Meeting #87, Reno, USA Nov. 14-18, 2016, 5 pages.
LG Electronics, "NR Synchronization Signal Design," R1-1702437, 3GPP TSG RAN WG1 Meeting #88, Athens, Greece Feb. 13-17, 2017, 12 pages.
NTT Docomo, Inc., "Discussion on NR-PBCH design," R1-1702827, 3GPP TSG RAN WG1 Meeting #88, Athens, Greece, Feb. 13-17, 2017, 7 pages.
Samsung, "NR-PBCH designs," R1-1702905, 3GPP TSG RAN WG1 #88, Athens, Greece Feb. 13-17, 2017, 13 pages.
Intel Corporation, "NR PBCH Design," R1-1704711, 3GPP TSG RAN WG1 Meeting RAN1 #88bis, Spokane, WA, U.S. A. Apr. 3-7, 2017, 7 pages.
Intel Corporation, "Delivery of Remaining Minimum System Information," R1-1704712, 3GPP TSG RAN WG1 Meeting RAN1 #88bis. Spokane, WA, U.S.A. Apr. 3-7, 2017, 3 pages.
NTT Docomo, Inc., "Further views on wider bandwidth operations for NR," R1-1708494, 3GPP TSG RAN WG1 Meeting #89, Hangzhou, P.R. China May 15-19, 2017, 6 pages.
Samsung, "Remaining issues of NR-PBCH," R1-1709180, 3GPP TSG RAN WG1 #89, Hangzhou, P.R. China May 15-19, 2017, 9 pages.
NTT Docomo, Inc., "Discussion and evaluation on NR-PBCH design," R1-1709192, 3GPP TSG RAN WG1 Meeting 189, Hangzhou, P.R. China May 15-19, 2017, 8 pages.
NTT Docomo, Inc., "Remaing issues on wider bandwidth operations for NR," R1-1711131, 3GPP TSG RAN WG1 NR Ad-Hoc#2, Qingdao, P.R. China Jun. 27-30, 2017, 6 pages.
Ericsson, "On cell identification in NR," R4-1703202, 3GPP TSG RAN WG4 Meeting #82bis, Spokane, Washington, USA, Apr. 3-7 2017, 3 pages.
Nokia, Alcatel-Lucent Shanghai Bell, "Sync signal raster and subcarrier spacing," R4-1705697, 3GPP TSG-RAN WG4 #83 Meeting, Hangzhou, China, May 15-19, 2017, 7 pages.
Extended European Search Report in European Application No. 18817357.9, dated Feb. 11, 2020, 6 pages.
Qualcomm Incorporated, "Synchronization signal sequence design," R1-1708568, 3GPP TSG-RAN WG1 #89, Hangzhou, P.R. China, dated May 15-19, 2017, 8 pages, XP051273761.
United States Office Action in U.S. Appl. No. 16/064,980, dated Feb. 28, 2020, 19 pages.
United States Final Office Action in U.S. Appl. No. 16/064,980, dated Jun. 10, 2020, 22 pages.
Japanese Office Action in Japanese Application No. 2019-527852, dated Aug. 4, 2020, 6 pages (with English translation).
LG Electronics, "Discussion on CORESET configuration," R1-1710305, 3GPP TSG RAN WG1 NR Ad-Hoc#2, Qingdao, P.R. China, dated Jun. 27-30, 2017, 7 pages.
United States Office Action in U.S. Appl. No. 16/064,980, dated Oct. 1, 2020, 23 pages.

* cited by examiner (A) CONTROL-PLANE PROTOCOL STACK (B) USER-PLANE PROTOCOL STACK (a)

(b)

(a) Equal mapping
(DMRS density 1/3)

(b) DMRS + SSS
(no DMRS within SSS bandwidth)

▨ : No DMRS mapping

▨ : DMRS mapping (Density 1/3)

▨ : NR-SSS transmission band

METHOD AND APPARATUS FOR TRANSMITTING AND RECEIVING DOWNLINK CHANNEL

CROSS-REFERENCE TO RELATED APPLICATIONS

This application is a National Stage application under 35 U.S.C. § 371 of International Application No. PCT/KR2018/006790, filed on Jun. 15, 2018, which claims the benefit of U.S. Provisional Application No. 62/544,212, filed on Aug. 11, 2017, and U.S. Provisional Application No. 62/521,263, filed on Jun. 16, 2017. The disclosures of the prior applications are incorporated by reference in their entirety.

TECHNICAL FIELD

The present disclosure relates to a method and apparatus for transmitting and receiving a downlink (DL) channel, and more particularly, to a method and apparatus for transmitting and receiving a DL channel on the basis of a subcarrier spacing for the DL channel, indicated by physical broadcast channel (PBCH) contents included in a synchronization signal block (SSB).

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

The present disclosure is intended to provide a method and apparatus for transmitting and receiving a downlink (DL) channel.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method for receiving a downlink channel by a user equipment (UE) in a wireless communication system may include receiving a synchronization signal block (SSB) including a primary synchronization signal (PSS), a secondary synchronization signal (SSS), and a physical broadcasting channel (PBCH), and acquiring an indicator indicating a subcarrier spacing for the downlink channel from the PBCH, and receiving the downlink signal on the basis of the subcarrier spacing. The indicator may indicate a different subcarrier spacing according to a frequency band in which the UE operates.

Herein, the indicator may be 1 bit.

Further, if the frequency band in which the UE operates exceeds a specific value, the subcarrier spacing indicated by the indicator may be 60 kHz or 120 kHz.

Further, if the frequency band in which the UE operates is below a specific value, the subcarrier spacing indicated by the indicator may be 15 kHz or 30 kHz.

Further, the downlink channel may carry system information or a message for initial access.

Further, a subcarrier spacing for the system information and a subcarrier spacing for the message for initial access may be equal.

According to the present disclosure, a UE for receiving a downlink channel in a wireless communication system may include a transceiver configured to transmit and receive a wireless signal to and from a BS, and a processor configured to control the transceiver to receive a synchronization signal block (SSB) including a primary synchronization signal (PSS), a secondary synchronization signal (SSS), and a physical broadcasting channel (PBCH), to acquire an indicator indicating a subcarrier spacing for the downlink channel from the PBCH, and to control the transceiver to receive the downlink signal on the basis of the subcarrier spacing. The indicator may indicate a different subcarrier spacing according to a frequency band in which the UE operates.

Herein, the indicator may be 1 bit.

Further, if the frequency band in which the UE operates exceeds a specific value, the subcarrier spacing indicated by the indicator may be 60 kHz or 120 kHz.

Further, if the frequency band in which the UE operates is below a specific value, the subcarrier spacing indicated by the indicator may be 15 kHz or 30 kHz.

Further, the downlink channel may carry system information or a message for initial access.

Further, a subcarrier spacing for the system information and a subcarrier spacing for the message for initial access may be equal.

According to an embodiment of the present disclosure, a method for transmitting a downlink channel by a BS in a wireless communication system may include transmitting a synchronization signal block (SSB) including a primary synchronization signal (PSS), a secondary synchronization signal (SSS), and a physical broadcasting channel (PBCH), and transmitting the downlink signal on the basis of a subcarrier spacing indicator transmitted on the PBCH. The subcarrier spacing indicator may indicate a different subcarrier spacing according to a frequency band in which a UE operates.

According to the present disclosure, a BS for transmitting a downlink channel in a wireless communication system may include a transceiver configured to transmit and receive a wireless signal to and from a UE, and a processor configured to control the transceiver to transmit a synchronization signal block (SSB) including a primary synchronization signal (PSS), a secondary synchronization signal (SSS), and a physical broadcasting channel (PBCH), and to control the transceiver to transmit the downlink signal on the basis of a subcarrier spacing indicator transmitted on the PBCH. The subcarrier spacing indicator may indicate a different subcarrier spacing according to a frequency band in which the UE operates.

Advantageous Effects

According to the present disclosure, a DL channel is received on the basis of a subcarrier spacing for the DL channel, indicated by a synchronization signal block (SSB). Therefore, the DL channel can also be received with a different numerology from that of the SSB.

It will be appreciated by persons skilled in the art that the effects that can be achieved with the present disclosure are not limited to what has been particularly described hereinabove and other effects of the present disclosure will be more clearly understood from the following detailed description taken in conjunction with the accompanying drawings.

BEST MODE FOR CARRYING OUT THE INVENTION

Figure 1:
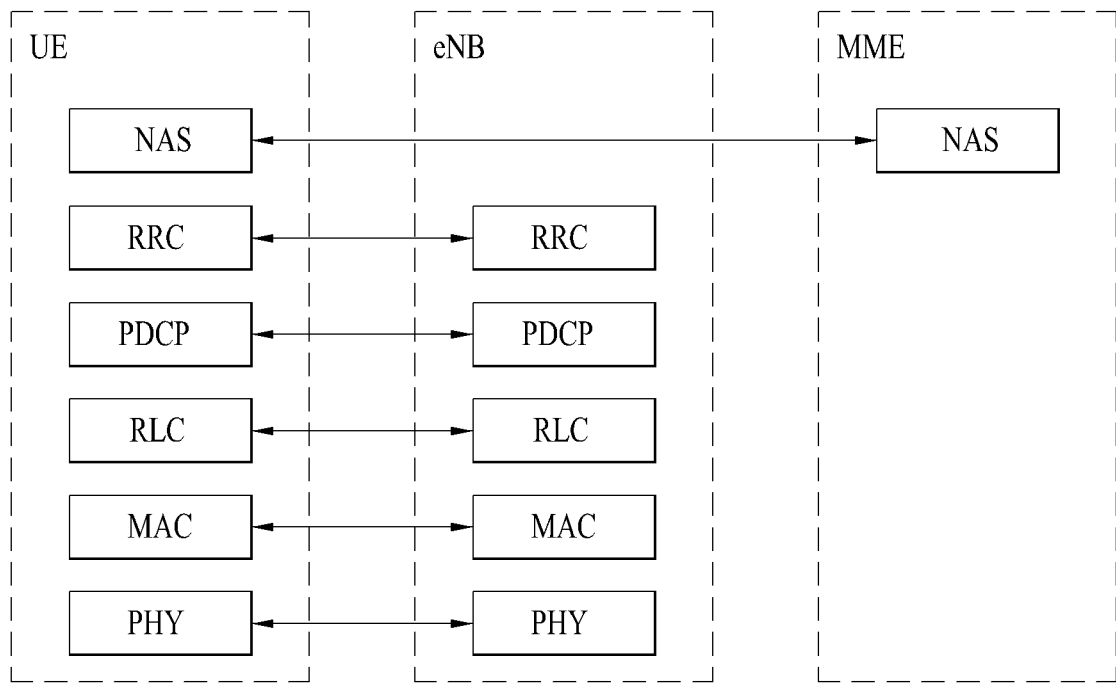
FIG. 1 is a view illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.
Figure 1:
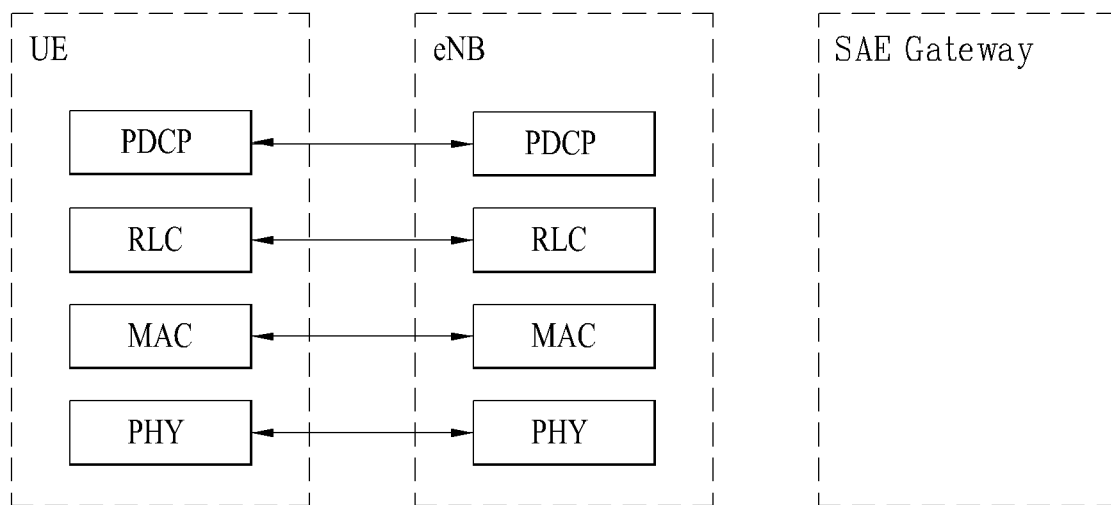

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
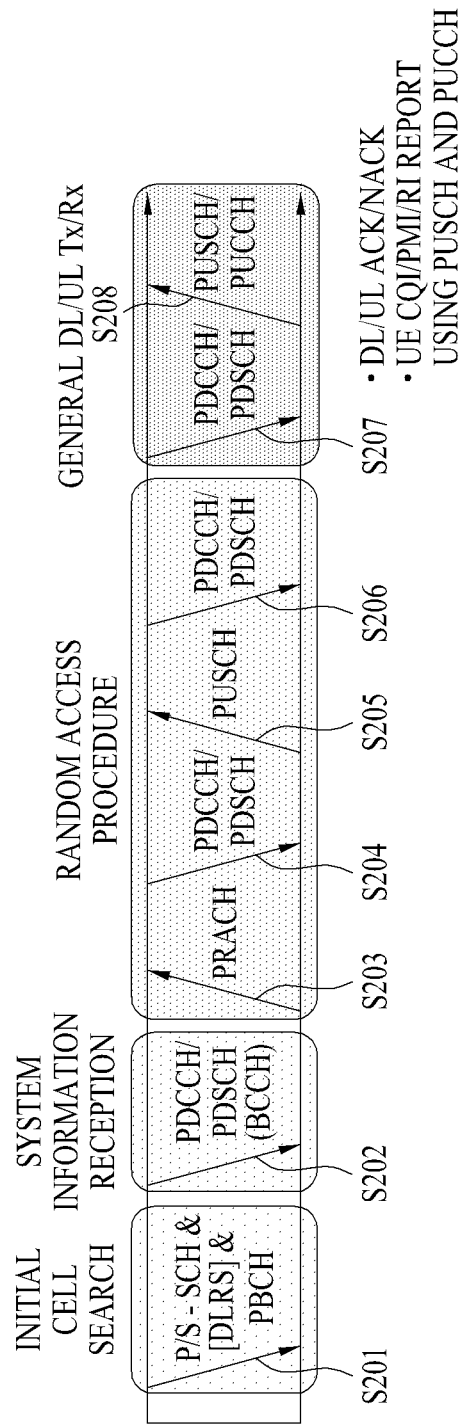
FIG. 2 is a view illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
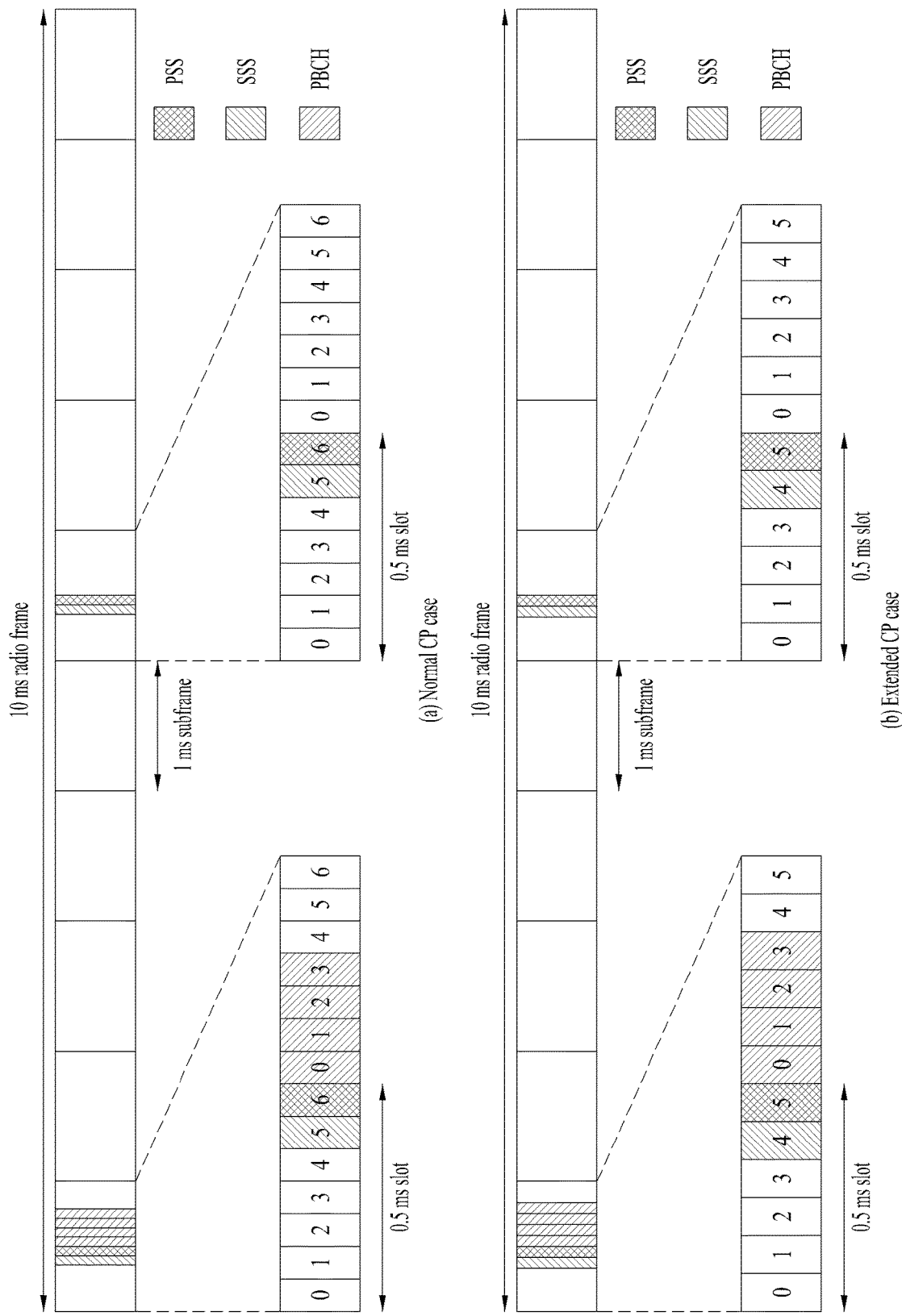
FIG. 3 is a view illustrating a radio frame structure for transmitting a synchronization signal (SS) in a long term evolution (LTE) system.

FIG. 3 is a diagram illustrating a radio frame structure for transmitting a synchronization signal (SS) in LTE system. In particular, FIG. 3 illustrates a radio frame structure for transmitting a synchronization signal and PBCH in frequency division duplex (FDD). FIG. 3(a) shows positions at which the SS and the PBCH are transmitted in a radio frame configured by a normal cyclic prefix (CP) and FIG. 3(b) shows positions at which the SS and the PBCH are transmitted in a radio frame configured by an extended CP.

Figure 4:
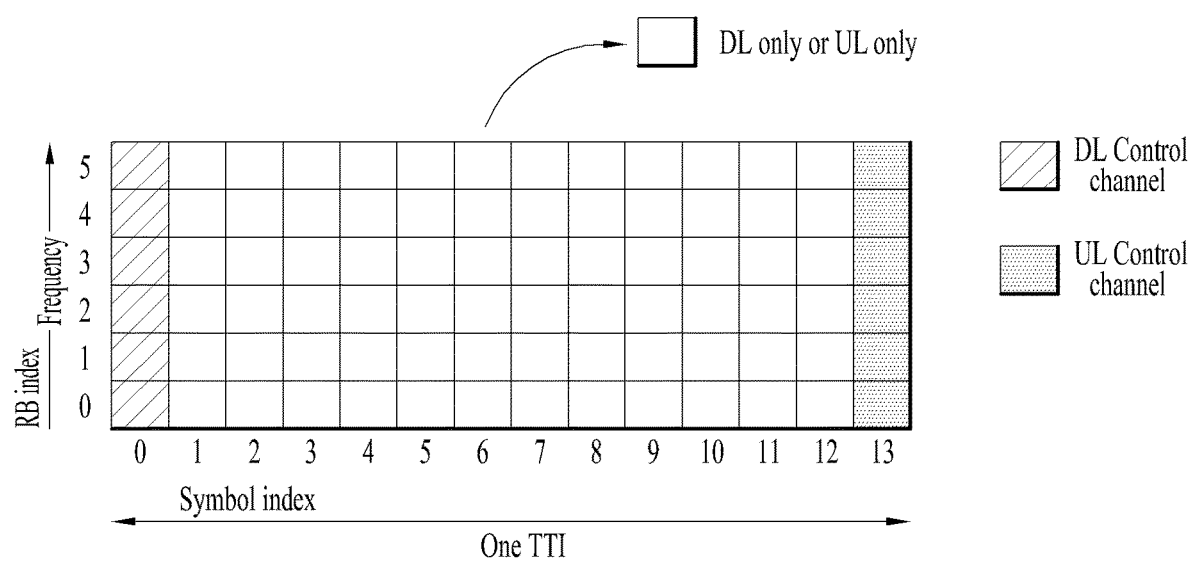
FIG. 4 is a view illustrating an exemplary slot structure available in new radio access technology (NR).

An SS will be described in more detail with reference to FIG. 3. An SS is categorized into a primary synchronization signal (PSS) and an secondary synchronization signal (SSS). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 4, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 3, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit cyclic redundancy check (CRC) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present invention.

Step 1: RACH preamble (via PRACH) (UE to eNB)
Step 2: Random access response (RAR) (via PDCCH and PDSCH (eNB to)
Step 3: Layer 2/Layer 3 message (via PUSCH) (UE to eNB)
Step 4: Contention resolution message (eNB to UE)

On the other hand, the dedicated random access procedure includes 3 steps described in the following. Messages transmitted via the 3 steps can be respectively referred to as message (Msg) 0 to 2 in the present invention. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)
Step 1: RACH preamble (via PRACH) (UE to eNB)
Step 2: Random access response (RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In the LTE/LTE-A system, a subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

<OFDM Numerology>

A New RAT system adopts an OFDM transmission scheme or a transmission scheme similar to the OFDM transmission scheme. The New RAT system may use different OFDM parameters from LTE OFDM parameters. Or the New RAT system may follow the numerology of legacy LTE/LTE-A but have a larger system bandwidth (e.g., 100 MHz). Or one cell may support a plurality of numerologies. That is, UEs operating with different numerologies may co-exist within one cell.

<Subframe Structure>

In the 3GPP LTE/LTE-A system, a radio frame is 10 ms(307200 $T_s$) long, including 10 equal-size subframes (SFs). The 10 SFs of one radio frame may be assigned numbers. $T_s$ represents a sampling time and is expressed as $T_s=1/(2048*15 \text{ kHz})$. Each SF is 1 ms, including two slots. The 20 slots of one radio frame may be sequentially numbered from 0 to 19. Each slot has a length of 0.5 ms. A time taken to transmit one SF is defined as a transmission time interval (TTI). A time resource may be distinguished by a radio frame number (or radio frame index), an SF number (or SF index), a slot number (or slot index), and so on. A TTI refers to an interval in which data may be scheduled. In the current LTE/LTE-A system, for example, there is a UL grant or DL grant transmission opportunity every 1 ms, without a plurality of UL/DL grant opportunities for a shorter time than 1 ms. Accordingly, a TTI is 1 ms in the legacy LTE/LTE-A system.

FIG. 4 illustrates an exemplary slot structure available in the new radio access technology (NR).

To minimize a data transmission delay, a slot structure in which a control channel and a data channel are multiplexed in time division multiplexing (TDM) is considered in 5$^{th}$ generation (5G) NR.

In FIG. 4, an area marked with slanted lines represents a transmission region of a DL control channel (e.g., PDCCH) carrying DCI, and a black part represents a transmission region of a UL control channel (e.g., PUCCH) carrying UCI. DCI is control information that a gNB transmits to a UE, and may include information about a cell configuration that a UE should know, DL-specific information such as DL scheduling, and UL-specific information such as a UL grant. Further, UCI is control information that a UE transmits to a gNB. The UCI may include an HARQ ACK/NACK report for DL data, a CSI report for a DL channel state, a scheduling request (SR), and so on.

In FIG. 4, symbols with symbol index 1 to symbol index 12 may be used for transmission of a physical channel (e.g., PDSCH) carrying DL data, and also for transmission of a physical channel (e.g., PUSCH) carrying UL data. According to the slot structure illustrated in FIG. 2, as DL transmission and UL transmission take place sequentially in one slot, transmission/reception of DL data and reception/transmission of a UL ACK/NACK for the DL data may be performed in the one slot. As a consequence, when an error is generated during data transmission, a time taken for a data retransmission may be reduced, thereby minimizing the delay of a final data transmission.

In this slot structure, a time gap is required to allow a gNB and a UE to switch from a transmission mode to a reception mode or from the reception mode to the transmission mode. For the switching between the transmission mode and the reception mode, some OFDM symbol corresponding to a DL-to-UL switching time is configured as a guard period (GP) in the slot structure.

In the legacy LTE/LTE-A system, a DL control channel is multiplexed with a data channel in TDM, and a control channel, PDCCH is transmitted distributed across a total system band. In NR, however, it is expected that the bandwidth of one system will be at least about 100 MHz, which makes it inviable to transmit a control channel across a total band. If a UE monitors the total band to receive a DL control channel, for data transmission/reception, this may increase the battery consumption of the UE and decrease efficiency. Therefore, a DL control channel may be transmitted localized or distributed in some frequency band within a system band, that is, a channel band in the present disclosure.

In the NR system, a basic transmission unit is a slot. A slot duration includes 14 symbols each having a normal cyclic prefix (CP), or 12 symbols each having an extended CP. Further, a slot is scaled in time by a function of a used subcarrier spacing. That is, as the subcarrier spacing increases, the length of a slot decreases. For example, given 14 symbols per slot, if the number of slots in a 10-ms frame is 10 for a subcarrier spacing of 15 kHz, the number of slots is 20 for a subcarrier spacing of 30 kHz, and 40 for a subcarrier spacing of 60 kHz. As the subcarrier spacing increases, the length of an OFDM symbol decreases. The number of OFDM symbols per slot is different depending on the normal CP or the extended CP, and does not change according to a subcarrier spacing. The basic time unit for LTE, $T_s$ is defined as $1/(15000*2048)$ seconds, in consideration of the basic 15-kHz subcarrier spacing and a maximum FFT size of 2048. $T_s$ is also a sampling time for the 15-kHz subcarrier spacing. In the NR system, many other subcarrier spacings than 15 kHz are available, and since a subcarrier spacing is inversely proportional to a corresponding time length, an actual sampling time $T_s$ corresponding to subcarrier spacings larger than 15 kHz becomes shorter than $1/(15000*2048)$ seconds. For example, the actual sampling time for the subcarrier spacings of 30 kHz, 60 kHz, and 120 kHz may be $1/(2*15000*2048)$ seconds, $1/(4*15000*2048)$ seconds, and $1/(8*15000*2048)$ seconds, respectively.

<Analog Beamforming>

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lamda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Figure 5:
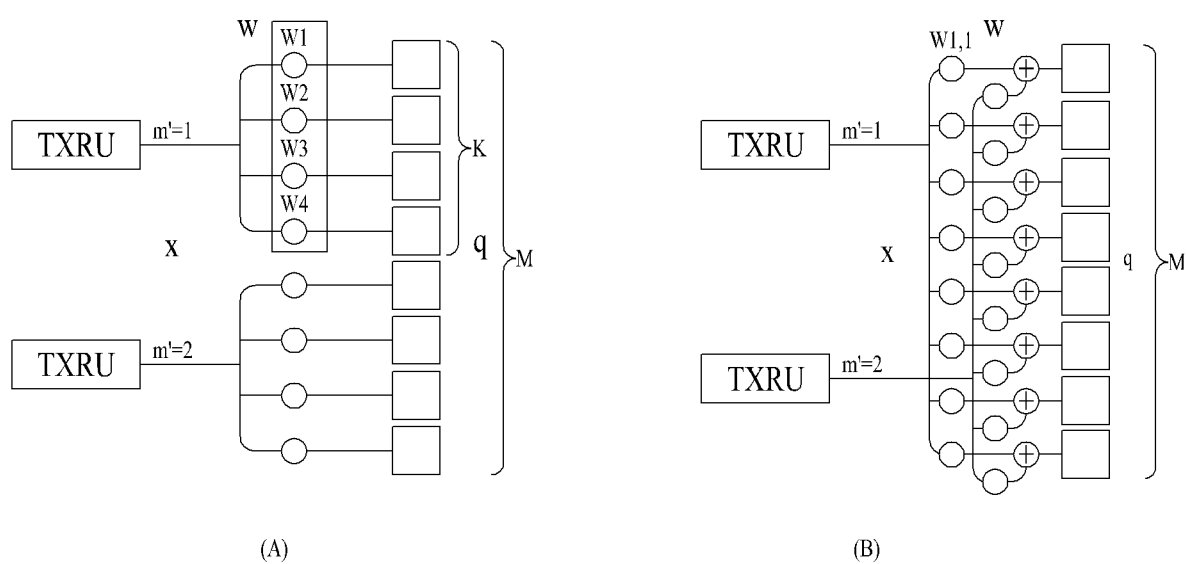
FIG. 5 is a view illustrating exemplary connection schemes between transceiver units (TXRUs) and antenna elements.

FIG. 5 is a view illustrating exemplary connection schemes between TXRUs and antenna elements.

(a) of FIG. 5 illustrates connection between a TXRU and a sub-array. In this case, an antenna element is connected only to one TXRU. In contrast, (b) of FIG. 5 illustrates connection between a TXRU and all antenna elements. In this case, an antenna element is connected to all TXRUs. In FIG. 5, W represents a phase vector subjected to multiplication in an analog phase shifter. That is, a direction of analog beamforming is determined by W. Herein, CSI-RS antenna ports may be mapped to TXRUs in a one-to-one or one-to-many correspondence.

As mentioned before, since a digital baseband signal to be transmitted or a received digital baseband signal is subjected to a signal process in digital beamforming, a signal may be transmitted or received in or from a plurality of directions on multiple beams. In contrast, in analog beamforming, an analog signal to be transmitted or a received analog signal is subjected to beamforming in a modulated state. Thus, signals cannot be transmitted or received simultaneously in or from a plurality of directions beyond the coverage of one beam. A gNB generally communicates with multiple users at the same time, relying on the wideband transmission or multiple antenna property. If the gNB uses analog BF or hybrid BF and forms an analog beam in one beam direction, the gNB has no way other than to communicate only with users covered in the same analog beam direction in view of the nature of analog BF. A later-described RACH resource allocation and gNB resource utilization scheme according to the present invention is proposed by reflecting limitations caused by the nature of analog BF or hybrid BF.

<Hybrid Analog Beamforming>

Figure 6:
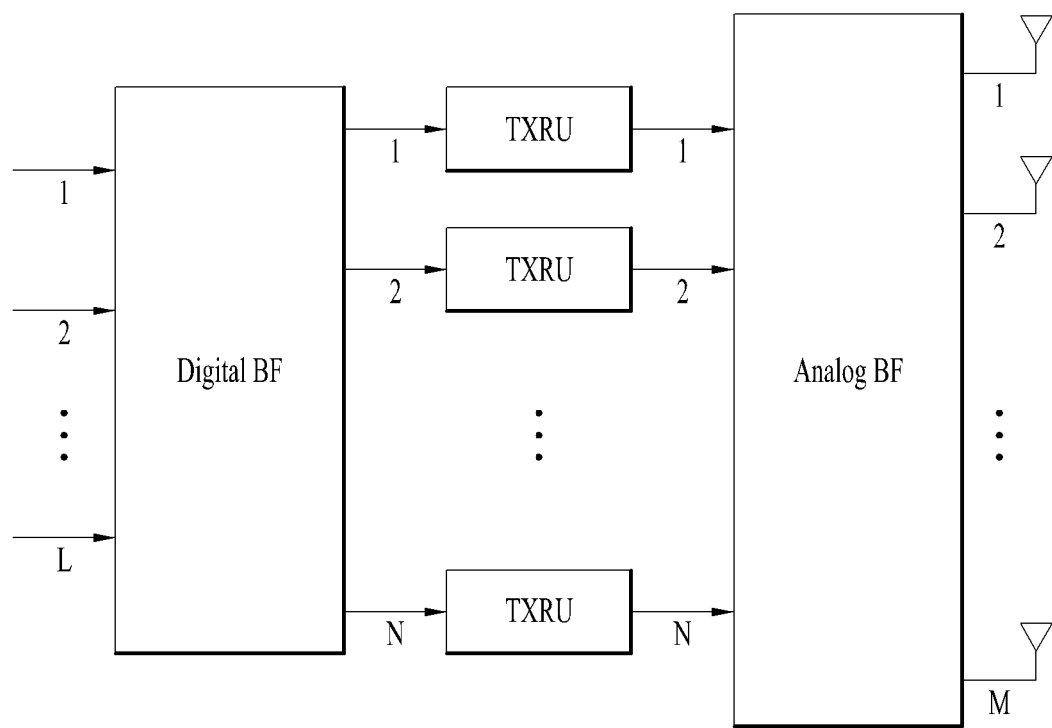
FIG. 6 is a view abstractly illustrating a hybrid beamforming structure in terms of TXRUs and physical antennas.

FIG. 6 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 6, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 7:
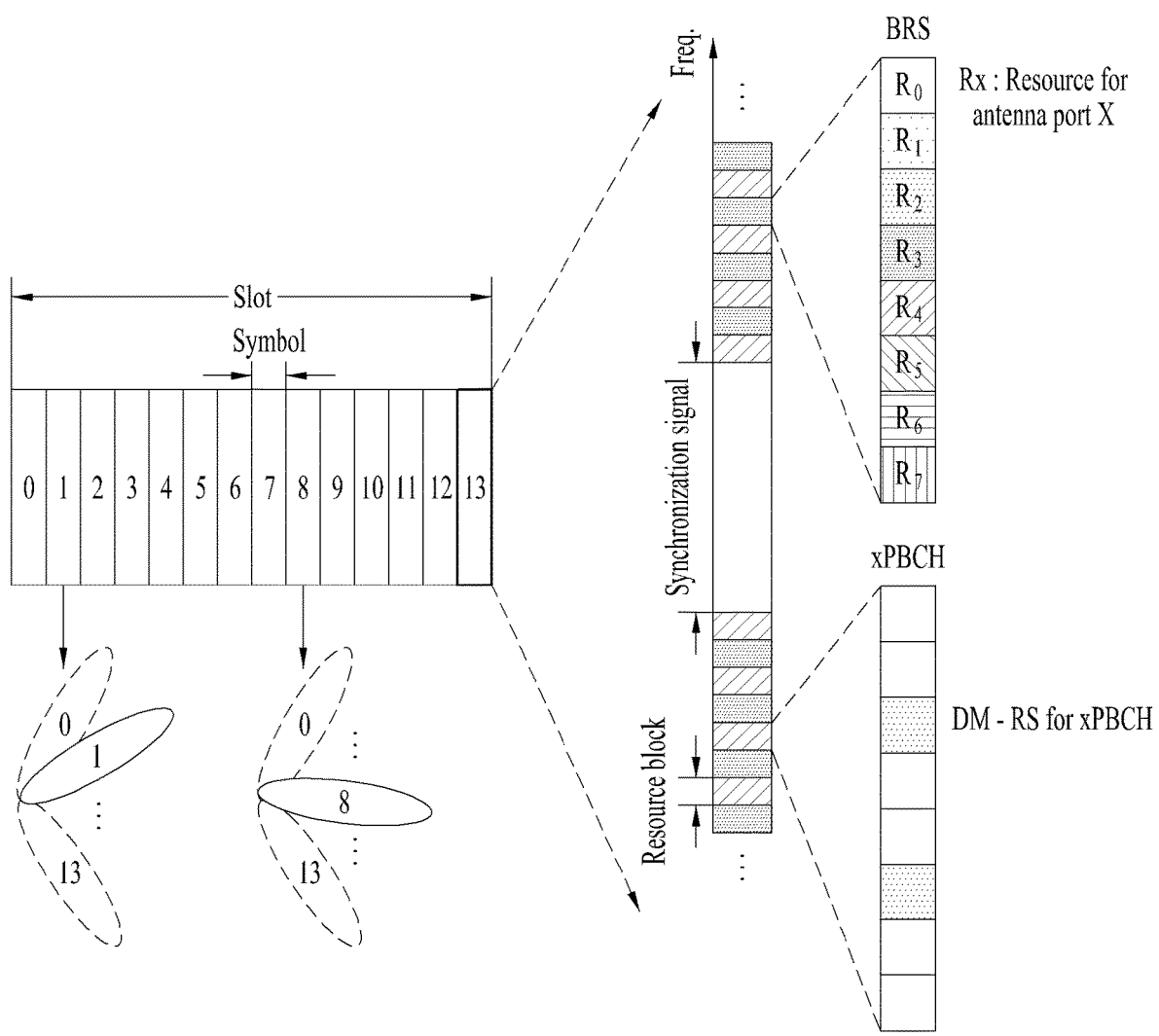
FIG. 7 is a view illustrating beam sweeping for a synchronization signal and system information during downlink (DL) transmission.

FIG. 7 is a view illustrating beam sweeping for an SS and system information during DL transmission. In FIG. 7, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 7 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 8:
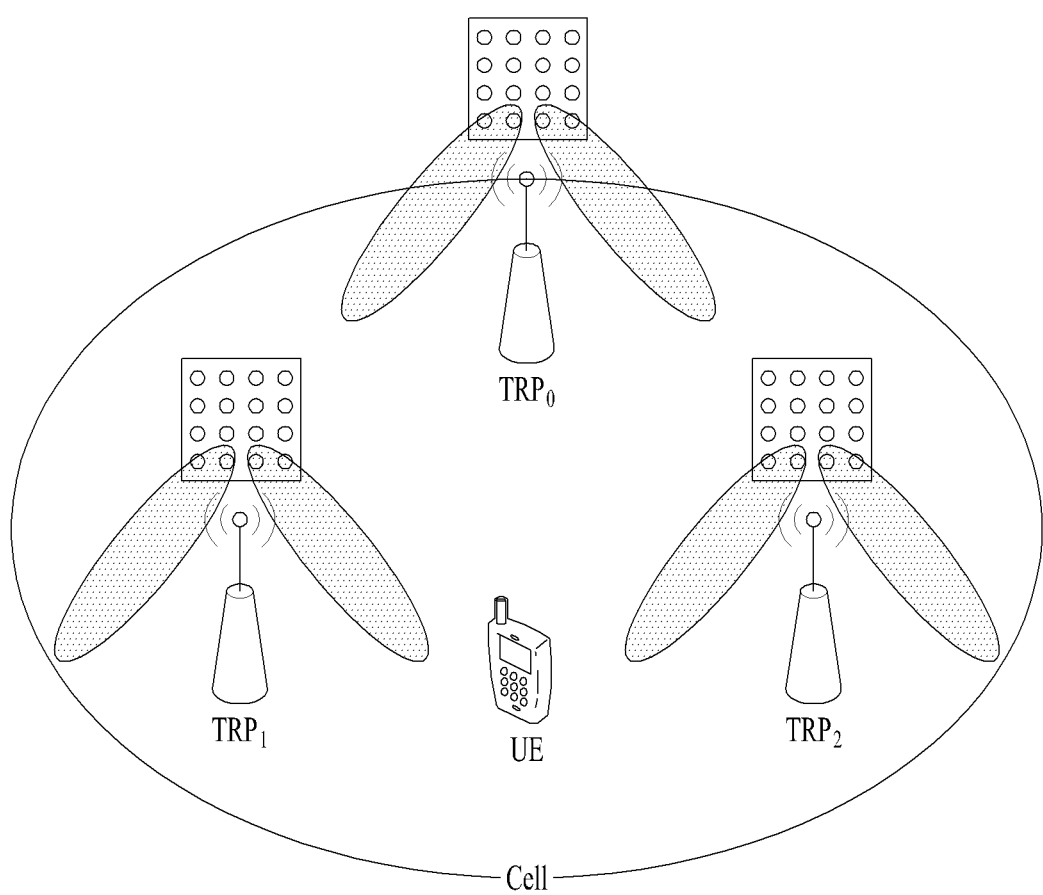
FIG. 8 is a view illustrating an exemplary cell in an NR system.

FIG. 8 is a view illustrating an exemplary cell in the NR system.

Referring to FIG. 8, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Now, a description will be given of a method for indicating the time index of a time at which an SS is transmitted, and a method for configuring a DL bandwidth by an SS according to an embodiment of the present disclosure.

1. SS Block Configuration

If the maximum size of payload of the PBCH is 80 bits, a total of four OFDM symbols may be used for transmission of an SS block. Meanwhile, there is a need for discussing the time positions of an NR-PSS, an NR-SSS, and an NR-PBCH included in an SSB. In an initial access state, the NR-PBCH may be used as a reference signal for accurate time/frequency tracking. To increase tracking accuracy, it is efficient to separate two OFDM symbols for the NR-PBCH as far as possible. Therefore, the first and fourth OFDM symbols of the SSB may be used for transmission of the NR-PBCH. Accordingly, the second OFDM symbol may be allocated to the NR-PSS, and the third OFDM symbol may be used for the NR-SSS.

The results of measuring PBCH decoding performance according to the number of REs for DMRSs reveal that if two OFDM symbols are allocated to the PBCH, 192 REs may be used for DMRSs, and 384 REs may be used for data. In this case, on the assumption that the PBCH payload size is 64 bits, a $1/12$ coding speed equal to that of an LTE PBCH may be achieved.

A method for mapping encoded NR-PBCH bits to REs in a PBCH symbol may be considered. However, this method has a shortcoming in interference and decoding performance. On the other hand, if the encoded NR-PBCH bits are mapped across REs included in N PBCH symbols, this method may have better performance in interference and decoding performance.

Meanwhile, a comparison between bits encoded in the same method in two OFDM symbols and bits encoded in different methods in two OFDM symbols reveals that the latter offers better performance because the encoded bits have more redundant bits. Accordingly, it may be considered to use bits encoded in different methods in two OFDM symbols.

In addition, a plurality of numerologies are supported in the NR system. Therefore, a numerology for SSB transmission may be different from a numerology for data transmission. Further, if different types of channels such as the PBCH and the PDSCH are multiplexed in the frequency domain, spectral emission may bring about inter-carrier interference (ICI) and thus performance degradation. To solve the problem, a guard frequency may be introduced between the PBCH and the PDSCH. Further, to reduce the effect of ICI, a network may allocate data RBs such that the data RBs are not adjacent to each other.

However, the foregoing method is not efficient in that a large number of REs should be reserved as a guard frequency. Thus, it may be more efficient to reserve one or more subcarriers at an edge as a guard frequency within a PBCH transmission bandwidth. The accurate number of reserved REs may be changed according to the subcarrier spacing of the PBCH. For example, for the 15-kHz subcarrier spacing for PBCH transmission, two subcarriers may be reserved at each edge of the PBCH transmission bandwidth. On the other hand, for the 30-kHz subcarrier spacing for PBCH transmission, one subcarrier may be reserved.

Figure 9:
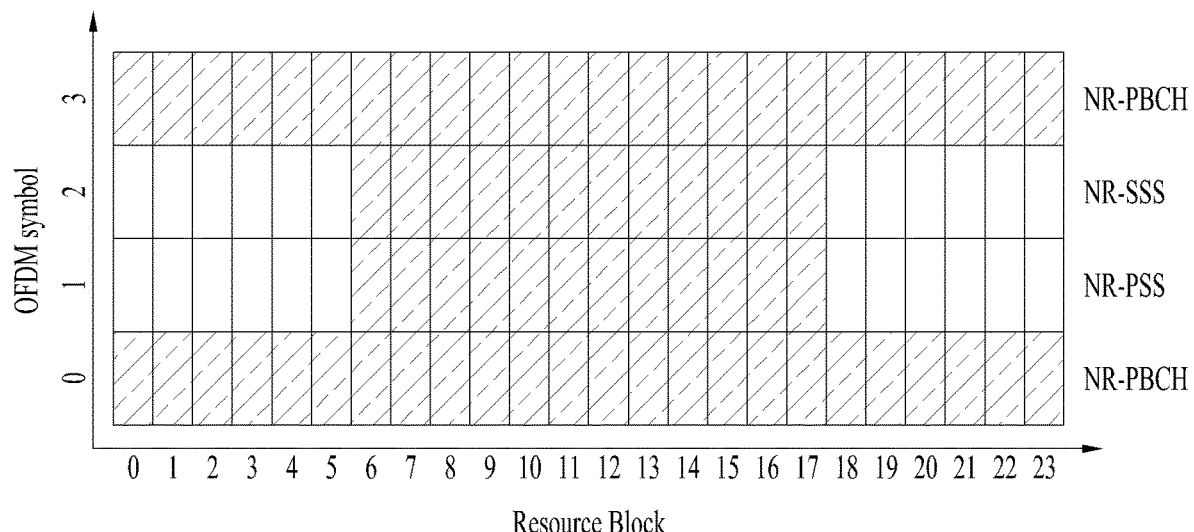
FIG. 9 is a view referred to for describing embodiments of multiplexing a primary synchronization signal (PSS), a secondary synchronization signal (SSS), and a physical broadcast channel (PBCH) in a synchronization signal (SS).
Figure 9:
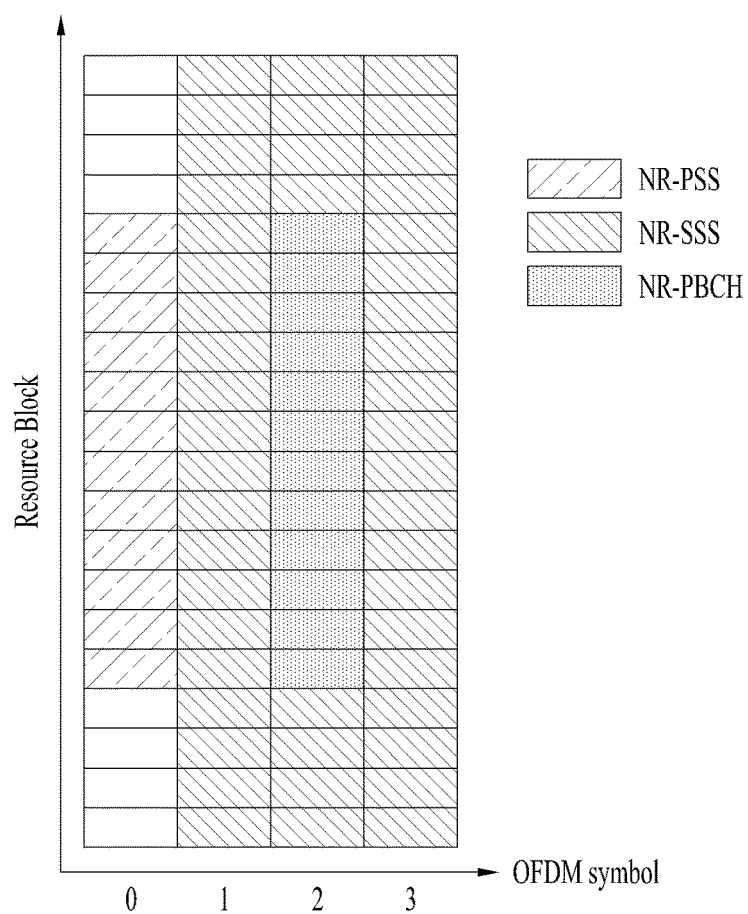

Referring to FIG. 9($a$), the NR-PBCH is allocated within 288 REs which form 24 RBs. Meanwhile, since the sequence of the NR-PSS/NR-SSS is of length 127, 12 RBs are required to transmit the NR-PSS/NR-SSS. That is, when an SSB is configured, the SSB is allocated in 24 RBs. Further, it is also preferred to allocate the SSB in 24 RBs for RB grid alignment between different numerologies such as 15, 30, and 60 kHz. Further, since a minimum bandwidth of 5 MHz in which 25 RBs can be defined with the 15-kHz subcarrier spacing is assumed in NR, 24 RBs are used for SSB transmission. In addition, the NR-PSS/SSS should be positioned in the middle of the SSB, which may imply that the NR-PSS/SSS is allocated in $7^{th}$ to $18^{th}$ RBs.

Meanwhile, if an SSB is configured as illustrated in FIG. 9($a$), a problem may occur to an automatic gain control (AGC) operation of a UE at subcarrier spacings of 120 kHz and 240 kHz. That is, for the subcarrier spacings of 120 kHz and 240 kHz, the NR-PSS may not be detected successfully due to the AGC operation. In this context, it may be considered to change the SSB configuration in the following two embodiments.

(Method 1) PBCH-PSS-PBCH-SSS
(Method 2) PBCH-PSS-PBCH-SSS-PBCH

That is, PBCH symbols may be positioned at the start of the SSB, and used as dummy symbols for the AGC operation, so that the UE performs the AGC operation more reliably.

Meanwhile, the NR-PSS/NR-SSS/NR-PBCH may be allocated as illustrated in FIG. 9($b$). that is, the NR-PSS may be allocated to symbol 0, and the NR-SSS may be allocated to symbol 2. The NR-PBCH may be allocated to symbol 1 to symbol 3. Herein, symbol 1 and symbol 3 may be dedicated to the NR-PBCH. In other words, only the NR-PBCH may be mapped to symbol 1 and symbol 3, and the NR-SSS and the NR-PBCH may be mapped together to symbol 2.

2. SS Burst Set Configuration

Figure 10:
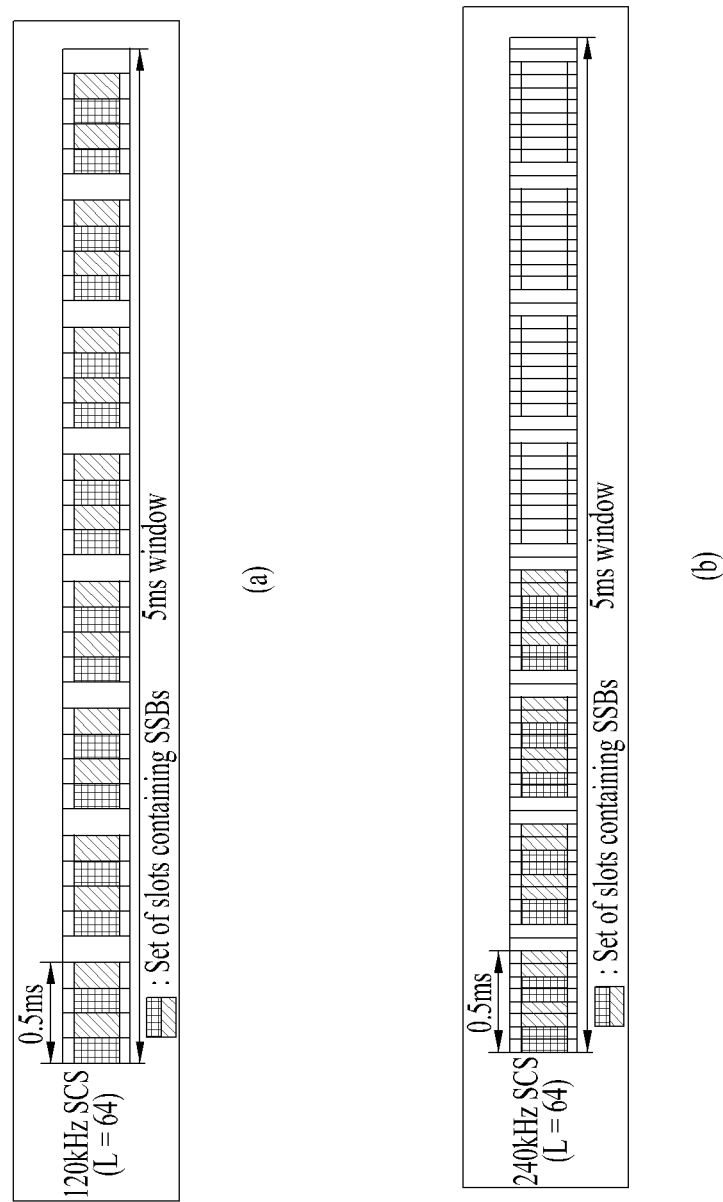
FIGS. 10 to 14 are views referred to for describing methods for configuring an SS burst and an SS burst set.

FIG. 10 illustrates SS burst sets configured at a subcarrier spacing of 120 kHz and a subcarrier spacing of 240 kHz, respectively. Referring to FIG. 10, for the subcarrier spacings of 120 kHz and 240 kHz, SS bursts are configured with a predetermined gap every four SS bursts. That is, SSBs are arranged with a 0.125-ms symbol period for UL transmission emptied every 0.5 ms.

However, a subcarrier spacing of 60 kHz may be used for data transmission in a frequency band at or above 6 GHz. That is, as illustrated in FIG. 11, the 60-kHz subcarrier spacing for data transmission and the 120-kHz subcarrier spacing or 240 kHz for SSB transmission may be multiplexed in NR.

Figure 11:
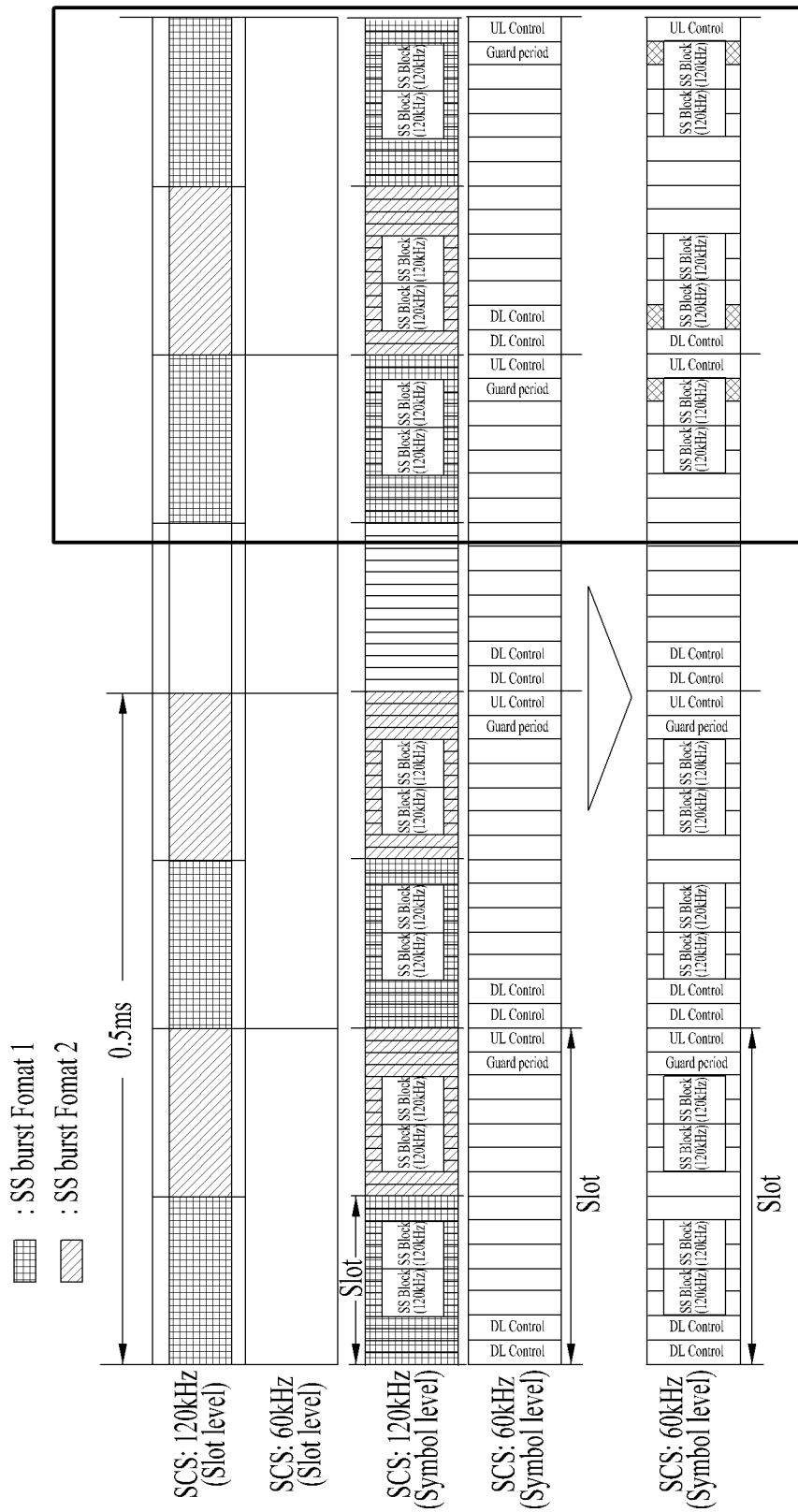

Meanwhile, it can be seen from a part marked with a square in FIG. 11 that as an SSB with the 120-kHz subcarrier spacing is multiplexed with data with the 60-kHz subcarrier spacing, the SSB with the 120-kHz subcarrier spacing, and a GP and a DL control region with the 60-kHz subcarrier spacing collide or overlap with each other. Since the collision between the SSB and the DL/UL control region should preferably be avoided, the configurations of an SS burst and an SS burst set need to be modified.

In the present disclosure, two embodiments are proposed to modify the SS burst configuration in order to avert the above problem.

Figure 12:
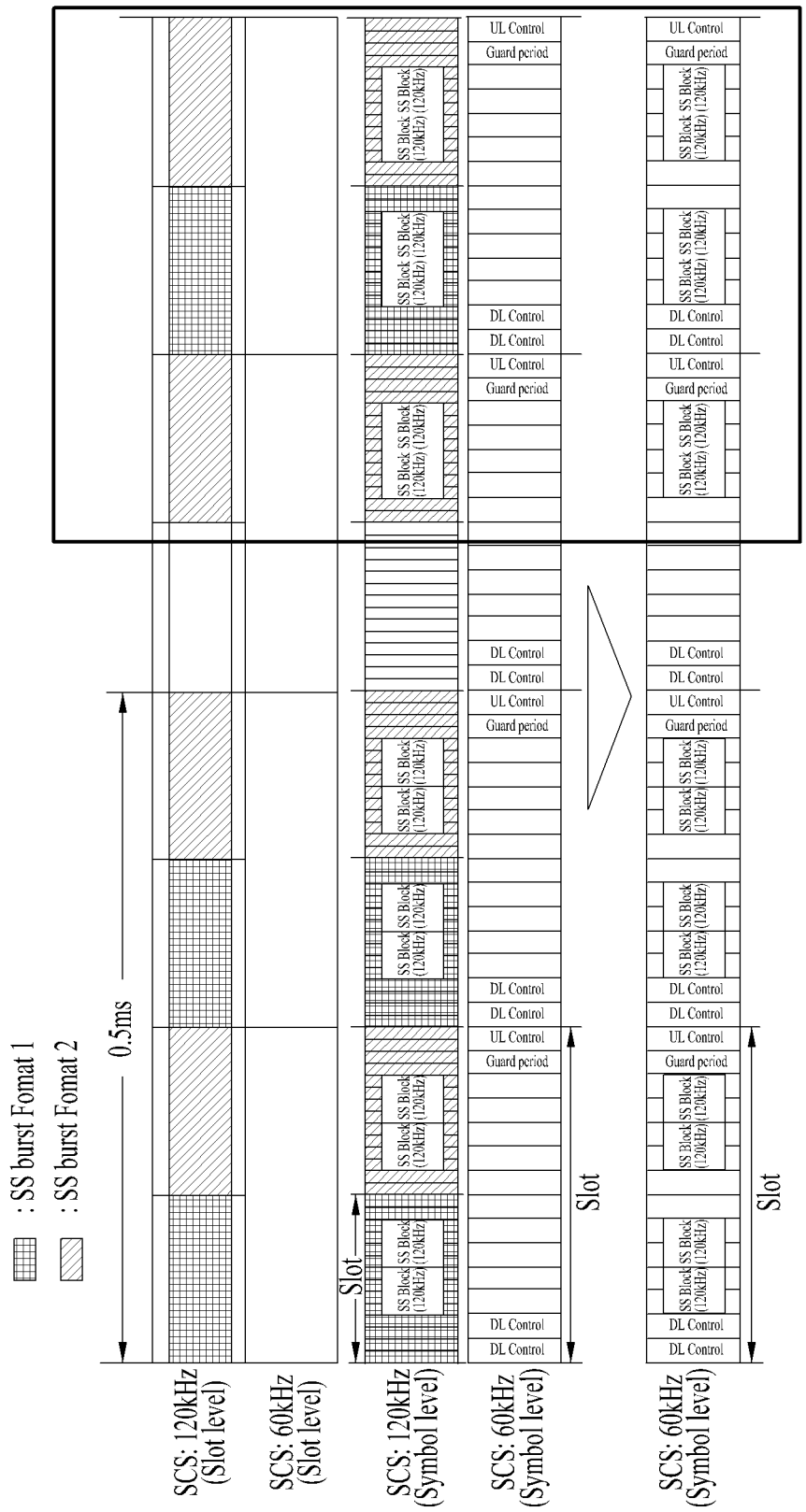

One of the embodiments is to change the positions of SS burst format 1 and SS burst format 2 as illustrated in FIG. 12. That is, SS burst format 1 and SS burst format 2 in the square box illustrated in FIG. 11 are exchanged as illustrated in FIG. 12, to prevent collision between the SSB and the DL/UL control region. In other words, SS burst format 1 is positioned at the start of a slot with the 60-kHz subcarrier spacing, and SS burst format 2 is positioned at the end of the slot with the 60-kHz subcarrier spacing.

The above embodiment may be summarized as follows.

1) 120-kHz Subcarrier Spacing
The first OFDM symbols of candidate SSBs have indexes {4, 8, 16, 20, 32, 36, 44, 48}+70*n. For carrier frequencies larger than 6 GHz, n=0, 2, 4, 6.
The first OFDM symbols of candidate SSBs have indexes {2, 6, 18, 22, 30, 34, 46, 50}+70*n. For carrier frequencies larger than 6 GHz, n=1, 3, 5, 7.

2) 240-kHz Subcarrier Spacing
The first OFDM symbols of candidate SSBs have indexes {8, 12, 16, 20, 32, 36, 40, 44, 64, 68, 72, 76, 88, 92, 96, 100}+140*n. For carrier frequencies larger than 6 GHz, n=0, 2.
The first OFDM symbols of candidate SSBs have indexes {4, 8, 12, 16, 36, 40, 44, 48, 60, 64, 68, 72, 92, 96, 100, 104}+140*n. For carrier frequencies larger than 6 GHz, n=1, 3.

Figure 13:
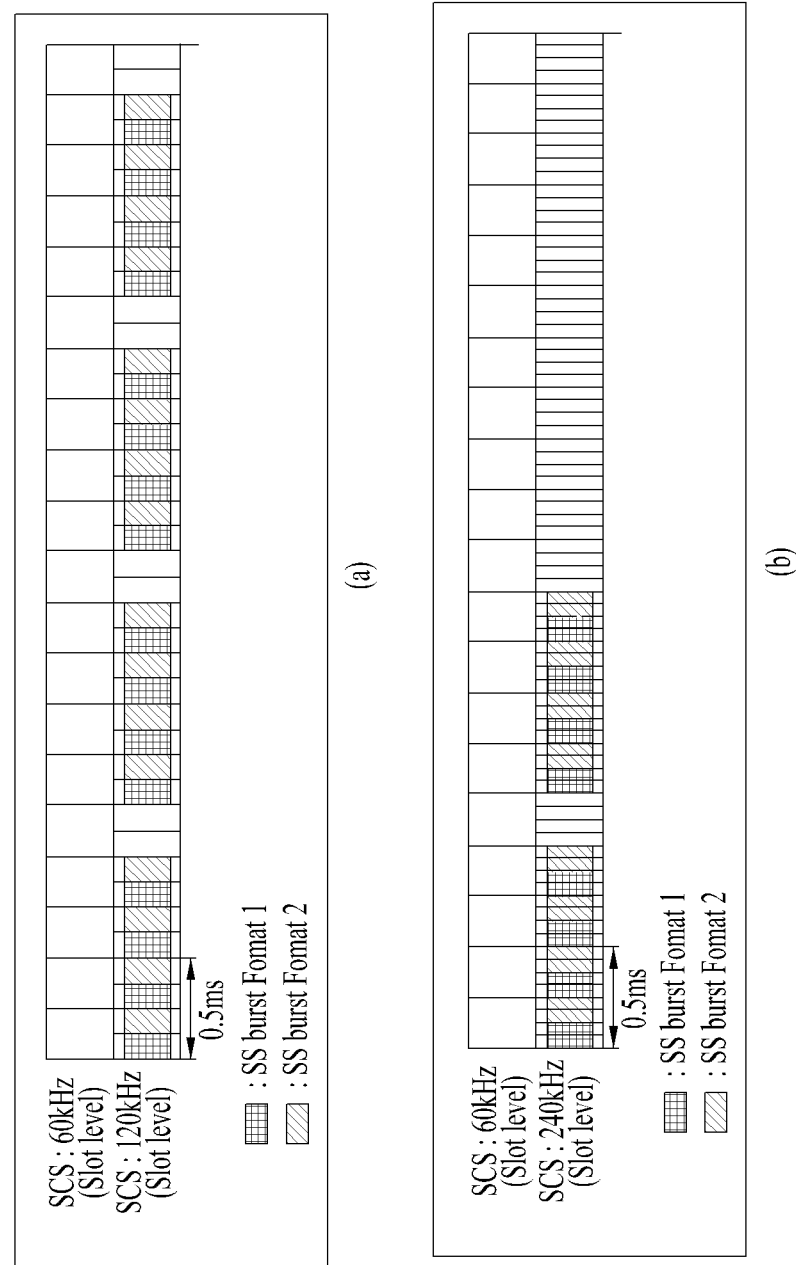

The other embodiment is to change the SS burst set configuration, as illustrated in FIG. 13. That is, the SS burst set may be configured such that the start boundary of the SS burst set is aligned with, that is, matches the start boundary of a slot with the 60-kHz subcarrier spacing.

Specifically, an SS burst is configured with SSBs localized for 1 ms. Therefore, an SS burst with the 120-kHz subcarrier spacing has 16 SSBs for 1 ms, and an SS burst with the 240-kHz subcarrier spacing has 32 SSBs for 1 ms. If an SS burst is configured in this manner, one slot is allocated as a gap between SS bursts, with respect to the 60-kHz subcarrier spacing.

The second embodiment is summarized as follows.

1) 120-kHz Subcarrier Spacing
The first OFDM symbols of candidate SSBs have indexes {4, 8, 16, 20}+28*n. For carrier frequencies larger than 6 GHz, n=0, 1, 2, 3, 5, 6, 7, 8, 10, 11, 12, 13, 15, 16, 17, 18.

2) 240-kHz Subcarrier Spacing

The first OFDM symbols of candidate SSBs have indexes {8, 12, 16, 20, 32, 36, 40, 44}+56*n. For carrier frequencies larger than 6 GHz, n=0, 1, 2, 3, 5, 6, 7, 8.

3. Method for Indicating Actual Transmitted SS/PBCH Block Within 5-ms Period

Meanwhile, the number of candidates for SSB transmission may be limited according to a network environment. For example, the number of candidates may be different according to a subcarrier spacing at which an SSB is arranged. In this case, the position of an actual transmitted SSB may be indicated to a CONNECTED/IDLE-mode UE. Herein, an actual transmitted SS/PBCH block indication indicating the position of an actual transmitted SSB may be used for the purpose of resource utilization, for example, rate matching for a serving cell, and for the purpose of measurement of corresponding resources, for a neighbor cell.

Regarding the serving cell, if a UE can accurately determine a non-transmitted SSB, the UE may determine that other information such as paging or data may be received in candidate resources of the non-transmitted SSB. For this resource flexibility, an SSB actually transmitted in the serving cell needs to be accurately indicted.

That is, since other information such as paging or data may not be received in resources carrying an SSB, the UE needs to know an SSB candidate which is not actually transmitted in order to increase the efficiency of resource utilization by receiving other data or signals in the non-transmitted SSB.

Thus, a 4-, 8- or 64-bit full bitmap is required to accurately indicate an SSB that is actually transmitted in a serving cell. The number of bits included in the bitmap may be determined according to the maximum number of SSBs transmittable in each frequency range. For example, in order to indicate an SSB actually transmitted in a 5-ms period, 8 bits are required in a frequency range of 3 GHz to 6 GHz, and 64 bits are required in a frequency range at or above 6 GHz.

Bits used to indicate an SSB actually transmitted in a serving cell may be defined by remaining minimum system information (RMSI) or other system information (OSI), and the RMSI/OSI includes configuration information for data or paging. The actual transmitted SS/PBCH block indication is associated with a DL resource configuration, and thus it may be concluded that the RMSI/OSI includes information about an actual transmitted SSB.

Meanwhile, an actual transmitted SS/PBCH block indication of a neighbor cell may be required to measure the neighbor cell. That is, for the neighbor cell measurement, time synchronization information about the neighbor cell needs to be acquired. In the case where the NR system is designed such that asynchronous transmission between TRPs is allowed, even though time synchronization information about a neighbor cell is known, the accuracy of the information may vary with a situation. Accordingly, when time information about a neighbor cell is indicated, the unit of the time information needs to be determined as information valid to a UE, while asynchronous transmission between TRPs is assumed.

However, if too many cells are listed, the full bitmap-type indicator is likely to increase signaling overhead too much. Therefore, an indicator compressed in various manners may be considered to decrease signaling overhead. Meanwhile, an indicator for an SSB transmitted in a serving cell may also be compressed in order to reduce signaling overhead as well as measure a neighbor cell. In other words, the following SS block indicator may be used to indicate actual transmitted SSBs in the neighbor cell and the serving cell. Further, according to the above description, although an SS burst may be a set of SSBs included in one slot on each subcarrier, an SS burst may mean an SSB group including a predetermined number of SSBs irrespective of slots, only in the following embodiments.

Figure 14:
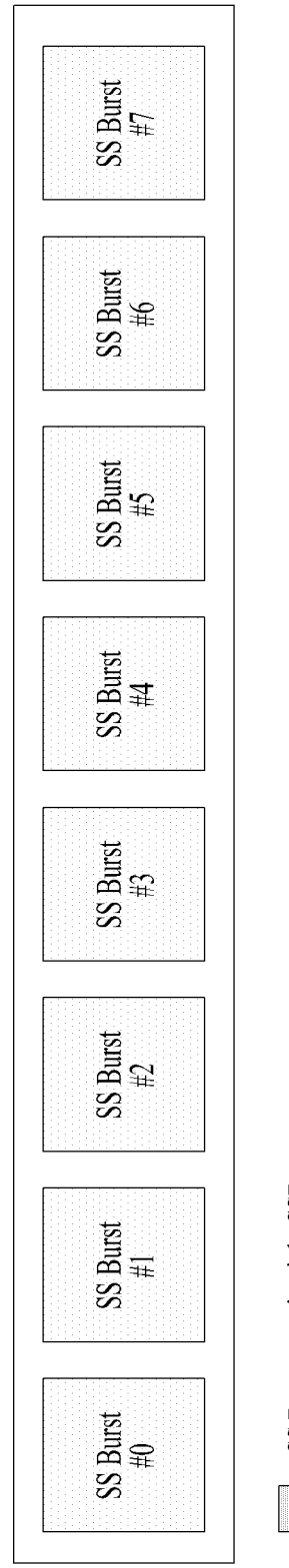

Referring to FIG. 14, in one of the embodiments, if an SS burst includes 8 SSBs, a total of 8 SS bursts may exist in a band at or above 6 GHz in which 64 SSBs are available.

SSBs are grouped into SS bursts in order to compress a 64-bit bitmap. Instead of the 64-bit bitmap, 8-bit information may be used to indicate an SS burst including an actual transmitted SSB. If the 8-bit bitmap indicates SS burst #0, SS burst #0 may include one or more actual transmitted SSBs.

Herein, additional information may be considered to additionally indicate the number of SSBs transmitted per SS burst. As many SSBs as indicated by the additional information may exist locally in each SS burst.

Therefore, a UE may estimate an actual transmitted SSB by considering the number of actual transmitted SSBs per SS burst, indicated by the additional information, and the bitmap indicating an SS burst including the actual transmitted SSBs in combination.

For example, indications in the following Table 1 may be assumed.

TABLE 1

| 8 bit bitmap (SS/PBCH burst unit) | The number of actually transmitted SS/PBCH block per SS/PBCH burst unit | Full bitmap |
| --- | --- | --- |
| 1 1 0 0 0 0 0 1 | 4 | (11110000) (11110000) (00000000) (00000000) (00000000) (00000000) (00000000) (11110000) |

That is, according to [Table 1], it may be determined from the 8-bit bitmap that SSBs are included in SS burst #0, SS burst #1, and SS burst #7, and it may be determined from the additional information that four SSBs are included in each SS burst. Therefore, it may be estimated that SSBs are transmitted at four candidate positions before SS burst #0, SS burst #1, and SS burst #7.

Meanwhile, unlike the above example, the additional information may also be transmitted in the form of a bitmap, thereby achieving flexibility in SSB transmission positions.

For example, information related to SS burst transmission may be indicated by a bitmap, and an SSB transmitted in an SS burst may be indicated by other bits.

That is, the total of 64 SSBs are divided into 8 SS bursts (i.e., SSB groups), and a used SS burst may be indicated to the UE by an 8-bit bitmap. If an SS burst is defined as illustrated in FIG. 14, if the SS burst is multiplexed with a slot with the 60-kHz subcarrier spacing, the SS burst is advantageously aligned with the boundary of a slot with the 60-kHz subcarrier spacing. Therefore, if it is indicated by the bitmap whether an SS burst is used, the UE may determine whether an SSB is transmitted or not, on a slot basis for every subcarrier spacing in a frequency band at or above 6 GHz.

The difference from the foregoing example lies in that the additional information is indicated in the form of a bitmap. In this case, since bitmap information should be transmitted for 8 SSBs included in each SS burst, 8 bits are needed, and the corresponding additional information applies commonly to all SS bursts. For example, if it is indicated by bitmap information for SS bursts that SS burst #0 and SS burst #1 are used, and it is indicated by additional bitmap information for SSBs that the first and fifth SSBs are transmitted in an SSB, the first and fifth SSBs in both of SS burst #0 and SS burst #1 are transmitted, and thus the total number of actual transmitted SSBs is 4.

Meanwhile, some neighbor cells may not be included in a cell list. The neighbor cells that are not included in the cell list use a default format for actual transmitted SSBs. Due to the use of the default format, the UE may measure the neighbor cells which are not included in the list. The default format may be predefined or configured by the network.

Meanwhile, if actual transmitted SSB information transmitted in the serving cell does not match actual transmitted SSB information transmitted in the neighbor cell, the UE may acquire the actual transmitted SSB information by giving priority to the actual transmitted SSB information transmitted in the serving cell.

That is, if actual transmitted SSB information is received in the form of a full bitmap and in the form of grouping, the information in the form of the full bitmap is likely to be more accurate, and thus the information of the full bitmap may be used with priority in SSB reception.

4. Signal and Channel for Time Index Indication

An SSB time index indication is delivered on the NR-PBCH. If the time index indication is included in a part of the NR-PBCH, such as NR-PBCH contents, a scrambling sequence, a CRC, or a redundancy version, the indication is transmitted safely to the UE. However, if the time index indication is included in the part of the NR-PBCH, the complexity of decoding of a neighbor cell NR-PBCH is added. Meanwhile, although decoding of an NR-PBCH from a neighbor cell is possible, the decoding is not mandatory in designing a system. Further, which signal and channel are suitable for delivering the SSB time index indication needs additional discussion.

Because SSB time index information will be used as reference information for time resource allocation to an initial access-related channel/signal such as system information or a PRACH preamble in a target cell, the SSB time index information should be transmitted safely to the UE. Meanwhile, a time index is used in RSRP measurement at an SSB level, for the purpose of neighbor cell measurement. In this case, there may be no need for very accurate SSB time index information.

In the present disclosure, it is proposed that an NR-PBCH DMRS is used as a signal carrying an SSB time index. Further, it is proposed that a time index indication is included in a part of the NR-PBCH. The part of the NR-PBCH may be, for example, the scrambling sequence, the redundancy version, or the like of the NR-PBCH.

According to the present disclosure, an SSB time index may be detected from the NR-PBCH DMRS, and the detected index may be identified by NR-PBCH decoding. Further, an index may be acquired from an NR-PBCH DMRS of a neighbor cell, for the purpose of neighbor cell measurement.

The time index indication may be configured in the following two embodiments.

(Method 1) A single index method in which every SSB in an SS burst set is indexed.

(Method 2) A multi-index method in which an index is assigned by a combination of an SS burst index and an SSB index.

If a single index method such as Method 1 is supported, a large number of bits are required to represent all SSBs within an SS burst set period. In this case, the DMRS sequence and scrambling sequence of the NR-PBCH preferably indicate an SSB indication.

On the other hand, if a multi-index method such as Method 2 is used, design flexibility for the index indication may be provided. For example, both an SS burst index and an SSB index may be included in a single channel. Further, each index may be transmitted individually in a different channel/signal. For example, an SS burst index may be included in the contents or scrambling sequence of the NR-PBCH, whereas an SSB index may be delivered in the DMRS sequence of the NR-PBCH.

Meanwhile, the maximum number of SSBs in a configured SS burst is changed according to a carrier frequency range. That is, the maximum number of SSBs is 8 in a frequency range at or below 6 GHz, and 64 in a frequency range between 6 GHz and 52.6 GHz.

Therefore, the number of bits required to indicate an SSB or the number of states required to indicate an SSB may vary according to a carrier frequency range. Accordingly, it may be considered to apply one of Method 1 and Method 2 according to a carrier frequency range. For example, the single index method may be applied at or below 6 GHs, and the multi-index method may be used at or above 6 GHz.

To describe in more detail, an SSB time index may be determined by the PBCH DMRS in the frequency range at or below 6 GHz. In this case, up to 8 states should be identified by the PBCH DMRS sequence. That is, 3 bits are required for the SSB time index. Further, a 5 ms boundary (a half time indicator) may be indicated by the PBCH DMRS sequence. In this case, a total of 16 states are required to indicate the DMRS-based SSB time index and the 5 ms boundary. In other words, in addition to 3 bits for the SSB time index, 1 bit is additionally required to indicate the 5 ms boundary. Further, there is no need for defining bits for an SSB time index in the PBCH contents, in the frequency range at or below 6 GHz.

Meanwhile, if the bits for indicating an SSB time index is transmitted in the NR-PBCH DMRS, decoding performance is better than in the PBCH contents. Further, if an additional signal is defined to indicate the SSB time index, the additional signal incurs signaling overhead. Since the NR-PBCH DMRS is an already defined sequence in the NR system, the NR-PBCH DMRS does not cause additional signaling overhead, thus preventing excessive signaling overhead.

Meanwhile, in the frequency range at or above 6 GHz, a part of the SSB time index may be indicated by the PBCH DMRS, whereas the remaining part of the SSB time index may be indicated by the PBCH contents. For example, to indicate a total of 64 SSB indexes, SSBs may be grouped into up 8 SSB groups in an SS burst set, each SSB group including up to 8 SSBs. In this case, 3 bits for indicating an SSB group may be defined in the PBCH contents, and an SSB time index within the SSB group may be defined by the PBCH DMRS sequence. In addition, if a synchronization network may be assumed in the frequency range at or above 6 GHz in the NR system, there is no need for performing a PBCH decoding procedure to acquire an SS burst index from PBCH contents.

5. NR-PBCH Contents

It is expected that the payload size of a master information block (MIB) will be increased on the basis of a response LS from RAN2 in the NR system. The MIB payload size and NR-PBCH contents, expected in the NR system, are given as follows.

1) Payload: 64 bits (48-bit information, 16-bit CRC)
2) NR-PBCH contents:
At least a part of SFN/H-SFN
Information about configuration of common search space
Information about central frequency of NR carrier After detecting a cell ID and symbol timing information, a UE may acquire network access information from a PBCH including an SFN, a part of timing information, such as an SSB index and a half frame timing, information related to a common control channel, such as a time/frequency position, a bandwidth, bandwidth part information such as the position of an SSB, and SS burst set information such as an SS burst set period and an actual transmitted SSB index.

Since the only limited time/frequency resources of 576 REs are occupied by the PBCH, mandatory information should be included in the PBCH. In addition, if possible, to further include mandatory information or additional information, an auxiliary signal such as a PBCH DMRS may be used.

(1) SFN (System Frame Number)

In NR, SFNs may be defined to distinguish 10-ms intervals. Further, indexes between 0 and 1023 may be introduced as the SFNs, similarly to the LTE system. The indexes may be explicitly indicated by bits or implicitly indicated.

In NR, a PBCH TTI is 80 ms and a minimum SS burst period is 5 ms. Therefore, up to 16 PBCHs may be transmitted, one per 80 ms, and a different scrambling sequence for each PBCH transmission may be applied to encoded PBCH bits. The UE may detect a 10-ms interval similarly to an LTE PBCH decoding operation. In this case, eight SFN states may be indicated implicitly by a PBCH scrambling sequence, and 7 bits for indicating an SFN may be defined in PBCH contents.

(2) Timing Information Within Radio Frame

An SSB index may be explicitly indicated by the PBCH DMRS sequence and/or bits included in the PBCH contents, according to a carrier frequency range. For example, for the frequency band at or below 6 GHz, 3 bits of the SSB index is delivered only by the PBCH DMRS sequence. Further, for the frequency band at or above 6 GHz, the three LSBs of the SSB index is delivered by the PBCH DMRS sequence, and the three MSBs of the SSB index is delivered by the PBCH contents. That is, up to 3 bits for an SSB index may be defined in the PBCH contents, only for a frequency range between 6 GHz and 52.6 GHz.

In addition, a half frame boundary may be indicated by the PBCH DMRS sequence. Particularly, in a frequency band at 3 GHz or below, it is more effective to include a half frame indicator in the PBCH DMRS than in the PBCH contents. That is, FDD is mainly used in the frequency band at or below 3 GHz, and thus time asynchronization between SFs or slots may be large. Therefore, for more accurate time synchronization, the half frame indicator is preferably delivered in the PBCH DMRS having better decoding performance than the PBCH contents.

On the contrary, in a frequency band above 3 GHz, TDD is mainly used and thus time asynchronization between subframes or slots is not much. Therefore, it may not matter much to deliver the half time indicator in the PBCH contents.

Meanwhile, the half time indicator may be delivered in both of the PBCH DMRS and the PBCH contents.

(3) Number of OFDM Symbols Included in Slot

Regarding the number of OFDM symbols in a slot in a carrier frequency range at or below 6 GHz, a 7-OFDM symbol slot and a 14-OFDM symbol slot are considered in NR. If it is determined to support both types of slots in the carrier frequency range at or below 6 GHz, a slot type indication should be defined to indicate time resources of a control resource set (CORESET).

(4) Information Identifying Absence of RMSI Corresponding to PBCH

In NR, an SSB may be used for operation measurement as well as for providing network access information. Particularly, multiple SSBs may be transmitted for measurement, for a wideband CC operation.

However, it may not be necessary to deliver RMSI in every frequency position carrying an SSB. That is, the RMSI may be transmitted in a specific frequency position, for efficiency of resource utilization. In this case, UEs, which perform an initial access procedure, may not determine whether RMSI is provided in a detected frequency position. To solve the problem, a bit field for identifying the absence of RMSI corresponding to a PBCH in a detected frequency area may need to be defined. Meanwhile, a method for identifying the absence of RMSI corresponding to a PBCH without using the bit field should also be considered.

For this purpose, an SSB without RMSI is to be transmitted in a frequency position which is not defined by a frequency raster. In this case, since UEs performing the initial access procedure are not capable of detecting an SSB, the above problem may be overcome.

(5) SS Burst Set Periodicity and Actual Transmitted SS Block

For the purpose of measurement, information about the periodicity of an SS burst set and an actual transmitted SSB may be indicated. Therefore, this information is preferably included in system information, for cell measurement and inter/intra cell measurement. That is, there is no need for defining the above information in PBCH contents.

(6) Bandwidth-Related Information

A UE attempts to detect a signal within an SSB bandwidth during an initial synchronization procedure including cell ID detection and PBCH decoding. Subsequently, the UE may acquire system information in a bandwidth indicated in PBCH contents by a network, and continue an initial access procedure in which an RACH procedure is performed. The bandwidth may be defined for the purpose of the initial access procedure. Frequency resources for a COCRESET, RMSI, OSI, and an RACH message may be defined within a bandwidth for a DL common channel. In addition, an SSB may be positioned in a part of the bandwidth for the DL common channel. In summary, the bandwidth for the DL common channel may be defined in PBCH contents. Further, an indication of a relative frequency position between the bandwidth for the SSB and the bandwidth for the DL common channel may be defined in the PBCH contents. To simplify the indication of a relative frequency position, a plurality of bandwidths for the SSB may be regarded as candidate positions in which the SSB is positioned within the bandwidth of the DL common channel.

(7) Numerology Information

For SSB transmission, the subcarrier spacings of 15, 30, 120, and 240 kHz are used. Meanwhile, the subcarrier spacings of 15, 30, 60 and 120 kHz are used for data transmission. For transmission of an SSB, a CORESET, and RMSI, the same subcarrier spacing may be used. Once RAN1 identifies information about the above-described subcarrier spacings, there is no need for defining numerology information in PBCH contents.

Meanwhile, a probable change of the subcarrier spacing for the CORESET and the RMSI may be considered. If only 15 subcarrier spacings are applied to SSB transmission according to an agreement on a minimum carrier bandwidth in RAN4, the subcarrier spacing may need to be changed to 30 kHZ for the next procedure after PBCH decoding. Further, if the 240-kHz subcarrier spacing is used for transmission of an SSB, the subcarrier spacing needs to be changed for data transmission because the 240-kHz subcarrier spacing is not defined for the data transmission. If RAN1 is capable of changing the subcarrier spacing for data transmission by PBCH contents, a 1-bit indicator may be defined for the purpose. The 1-bit indicator may be interpreted as {15, 30 kHz} or {60, 120 kHz} according to a carrier frequency range. In addition, the indicated subcarrier spacing may be considered to be a default numerology for an RB grid.

(8) Payload Size

A maximum payload size of 64 bits may be assumed in consideration of PBCH decoding performance, as illustrated in [Table 2].

TABLE 2

| Details | Bit size at or below 6 GHz | Bit size at or above 6 GHz |
|---|---|---|
| System Frame Number (MSB) | 7 | 7 |
| SS/PBCH block time index (MSB) | 0 | 3 |
| Reference numerology | [1] | [1] |
| Bandwidth for DL common channel, and SS block position | [3] | [2] |
| # of OFDM symbols in a Slot | [1] | 0 |
| CORESET (Frequency resource - bandwidth, location) (Time resource - starting OFDM symbol, Duration) (UE Monitoring Periodicity, offset, duration) | About [10] | About [10] |
| Reserved Bit | [20] | [20] |
| CRS | 16 + a | 16 + a |
| Total | 64 | 64 |

6. NR-PBCH Scrambling

A description will be given of the type of an NR-PBCH scrambling sequence and sequence initialization. Although it may be considered to use a PN sequence in NR, if use of a Gold sequence of length 31 defined in the LTE system as an NR-PBCH sequence does not cause a serious problem, it may be preferred to reuse the Gold sequence as an NR-PBCH scrambling sequence.

Further, the scrambling sequence may be initialized by at least a Cell-ID, and 3 bits of an SSB index indicated by a PBCH-DMRS may be used in initializing the scrambling sequence. Further, if a half frame indication is indicated by the PBCH-DMRS or another signal, the half frame indication may also be used as a seed value for initialization of the scrambling sequence.

7. NR-PBCH DMRS Design

In the NR system, a DMRS is introduced for phase reference of the NR-PBCH. Further, an NR-PSS/NR-SSS/NR-PBCH exists in every SSB, and OFDM symbols carrying the NR-PSS/NR-SSS/NR-PBCH are contiguous in a single SSB. However, if it is assumed that the NR-SSS and the NR-PBCH are transmitted in different transmission schemes, it cannot be assumed that the NR-SSS is used as an RS for NR-PBCH demodulation. In the NR system, therefore, the NR-PBCH should be designed on the assumption that the NR-SSS is not used as an RS for NR-PBCH demodulation.

To design a DMRS, DMRS overhead, a time/frequency position, and a scrambling sequence should be considered.

Overall PBCH decoding performance may be determined by channel estimation performance and an NR-PBCH coding rate. Because of tradeoff between channel estimation performance and a PBCH coding rate, an appropriate number of REs should be determined for DMRS transmission. For example, when four REs per RB are allocated to the DMRS, better performance may be provided. When two OFDM symbols are allocated for NR-PBCH transmission, 192 REs are used for the DMRS, and 384 REs are used for MIB transmission. In this case, on the assumption that the payload size is 64 bits, a 1/12 coding speed equal to the coding speed of the LTE PBCH may be achieved.

In addition, if a plurality of OFDM symbols are allocated for NR-PBCH transmission, which OFDM symbol is to include a DMRS becomes an issue. To prevent performance degradation caused by a residual frequency offset, the DMRS is preferably positioned in all OFDM symbols carrying the NR-PBCH. Accordingly, the DMRS may be included in all OFDM symbols used for NR-PBCH transmission.

Meanwhile, regarding the positions of OFDM symbols carrying the NR-PBCH, the PBCH DMRS is used as a time/frequency tracking RS, and as the spacing between two OFDM symbols carrying DMRSs is larger, frequency tracking is more accurate. Therefore, the first and fourth OFDM symbols may be allocated for transmission of the NR-PBCH.

Further, accordingly, interleaved mapping in the frequency domain may be assumed for the frequency position of the DMRS, which may be shifted according to a cell ID. An advantage of a uniformly distributed DMRS pattern is that DFT-based channel estimation may be used, which offers optimum performance in 1-D channel estimation. Further, in order to increase channel estimation performance, wideband RB bundling may be used.

For a DMRS sequence, a pseudo random sequence defined according to the type of a Gold sequence may be used. The length of the DMRS sequence may be defined by the number of DMRS REs per SSB. In addition, the DMRS sequence may be generated on the basis of a Cell-ID and a slot number/OFDM symbol index within a default period 20 ms of an SS burst set. Further, the index of an SSB may be determined on the basis of slot and OFDM symbol indexes.

Meanwhile, NR-PBCH DMRSs should be scrambled according to 1008 cell IDs and 3-bit SSB indexes. This is because a comparison of detection performance according to numbers of hypotheses of a DMRS sequence reveals that the detection performance of 3 bits is most suitable for the number of DMRS sequence hypotheses. However, since it seems that the detection performance of 4 to 5 bits has little performance loss, it does not matter to use a 4- or 5-bit hypothesis number.

Meanwhile, since an SSB time index and a 5-ms boundary should be represented by a DMRS sequence, a design should be made so that there are a total of 16 hypotheses.

In other words, the DMRS sequence should represent at least a cell ID, an SSB index within an SS burst set, and a half frame boundary (half frame indication), and may be initialized by the cell ID, the SSB index within an SS burst set, and the half frame boundary (half frame indication). A specific initialization equation is given as [Equation 1].

$$c_{init}=(N_{ID}^{SS/PBCH\ block}+1+8\cdot HF)\cdot(2\cdot N_{ID}^{cell}+1)\cdot 2^{10} \\ N_{ID}^{cell} \quad \text{[Equation 1]}$$

Herein, $N_{ID}^{SS/PBCHblock}$ represents an SSB index in an SSB group, and if $N_{ID}^{Cell}$ is a cell ID, HF represents a half frame indication index having a value of $\{0, 1\}$.

For the NR-PBCH DMRS sequence, a Gold sequence of length 31 may be used, similarly to the LTE DMRS sequence. Or the NR-PBCH DMRS sequence may be generated based on a Gold sequence of length 7 or 8.

Meanwhile, since detection performance is similar in the cases of using a Gold sequence of length 31 and a Gold sequence of length 7 or 8, the present disclosure proposes that the Gold sequence of length 31 is used, like the LTE DMRS, and a Gold sequence of a length larger than 31 may be considered in the frequency range at or above 6 GHz.

A DMRS sequence modulated in QPSK, $r_{N_{ID}^{SS/PBCH\ block}}(m)$ may be defined by [Equation 2].

$$r_{N_{ID}^{SS/PBCHblock}}(m) = \\ \frac{1}{\sqrt{2}}(1-2\cdot c(2m))+j\frac{1}{\sqrt{2}}(1-2\cdot c(2m+1)), \\ m=0,1,\ldots,143 \quad \text{[Equation 2]}$$

Further, BPSK and QPSK may be considered as a modulation scheme for generating the DMRS sequence. Although BPSK and QPSK are similar in detection performance, QPSK outperforms BPS in correlation performance. Thus, QPSK is more appropriate as a modulation scheme for generating the DMRS sequence.

Meanwhile, a pseudo random sequence used to generate the NR-PBCH DMRS sequence is defined as a Gold sequence of length 31, and a sequence c(n) of length $M_{PN}$ is defined by the following [Equation 3].

$$c(n)=(x_1(n\pm N_C)+x_2(n+N_C))\ \text{mod}\ 2$$

$$x_1(n+31)=(x_1(n+3)+x_1(n))\ \text{mod}\ 2$$

$$x_2(n+31)=(x_2(n+3)+x_2(n+2)+x_2(n+1)+x_2(n))\ \text{mod}\ 2 \quad \text{[Equation 3]}$$

Herein, n=0, 1, . . . , $M_{PN}$−1 and $N_C$=1600. The first m-sequence has an initial value, $x_1(0)=1$, $x_1(n)=0$, n=1, 2, . . . , 30, and the second m-sequence has an initial value defined by $$c_{init}=\sum_{i=0}^{30} x_2(i)\cdot 2^i \text{ where } x_2(i)=\left\lfloor\frac{c_{init}}{2^i}\right\rfloor \text{mod}\ 2,\ i=0,1,\ldots,30$$

8. NR-PBCH DMRS Pattern Design

Regarding the frequency position of the DMRS, two DMRS RE mapping methods may be considered. A fixing RE mapping method fixes an RS mapping area in the frequency domain, whereas a variable RE mapping method shifts an RS position according to a cell ID by a Vshift method. The variable RE mapping method advantageously randomizes interference and thus achieves an additional performance gain. Thus, it seems to be more preferable to use the variable RE mapping method.

The variable RE mapping will be described in detail. A complex modulation symbol $a_{k,l}$ included in a half frame may be determined by [Equation 4].

$$a_{k,l} = r_{N_{ID}^{SS/PBCHblock}}(72\cdot l' + m') \quad \text{[Equation 4]}$$

$$k = 4m' + v_{shift} \text{ if } l \in \{1, 3\}$$

$$l = \begin{cases} 1 & l' = 0 \\ 3 & l' = 1 \end{cases}$$

$$m' = 0, 1, \ldots, 71$$

$$v_{shift} = N_{ID}^{cell} \text{ mod } 3$$

Herein, k and l represent the indexes of a subcarrier and an OFDM symbol in an SSB, and $r_{N_{ID}^{SS/PBCH\ block}}(m)$ represents a DMRS sequence. Meanwhile, it may be determined by $V_{shift}=N_{ID}^{cell}$ mod 4.

Further, RS power boosting may be considered to improve performance. If RS power boosting and Vshift are used together, interference from interference total radiated power (TRP) may be reduced. Further, considering the detection performance gain of RS power boosting, the ratio of signal EPRE to PDSCH EPRE is preferably −1.25 dB.

Meanwhile, DMRS overhead, a time/frequency position, and a scrambling sequence should be determined to design a DMRS. Overall PBCH decoding performance may be determined by channel estimation performance and an NR-PBCH coding rate. Due to trade-off between channel estimation performance and a PBCH coding rate, an appropriate number of REs for the DMRS should be determined.

It can be seen from a test that allocation of 4 REs per RB (⅓ density) to the DMRS offers better performance. If two OFDM symbols are used for transmission of the NR-PBCH, 192 REs are used for the DMRS, and 384 REs are used for MIB transmission. In this case, on the assumption that the payload size is 64 bits, the same coding speed as the LTE PBCH, that is, 1/12 coding speed may be achieved.

Further, the DMRS may be used for a phase reference of the NR-PBCH. Herein, two methods may be considered for DMRS mapping. One of the methods is equidistant mapping in which each PBCH symbol is used, and a DMRS sequence is mapped to subcarriers at the same interval.

In a non-equidistant mapping scheme, each PBCH symbol is used, but a DMRS sequence is not mapped within an NR-SSS transmission bandwidth. Instead, the NR-SSS is used for PBCH demodulation in the non-equidistant mapping scheme. Therefore, the non-equidistant mapping scheme may require more resources for channel estimation than the equidistant mapping scheme. In addition, since a residual CFO may exist in the initial access procedure, SSS symbol-based channel estimation may not be accurate. That is, the equidistant mapping scheme is advantageous in CFO estimation and accurate time tracking.

Further, if an SSB time indication is transmitted in the PBCH DMRS, the equidistant mapping scheme may bring an additional benefit. The results of evaluating PBCH decoding performance according to the actual RE mapping scheme tell that the equidistant mapping scheme outperforms the non-equidistant mapping scheme. Accordingly, the equidistant mapping scheme is more suitable for the initial access procedure. Further, regarding the frequency position of a DMRS, interleaved DMRS mapping in the frequency domain, which may be shifted according to a cell ID, may be assumed. In addition, the equidistantly mapped DMRS pattern may preferably use DFT-based channel estimation which offers optimum performance in 1-D channel estimation.

9. Time Index Indication Method

Figure 15:
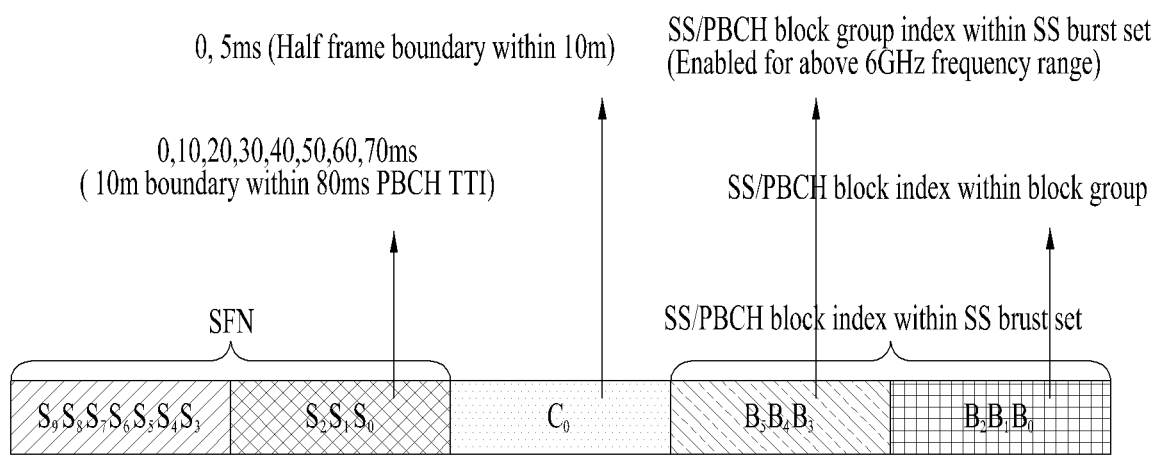
FIG. 15 is a view referred to for describing a method for indicating information about an SS index and an SS transmission time.

Referring to FIG. 15, time information includes an SFN, a half frame interval, and an SSB time index. Regarding each piece of time information, an SFN may be represented in 10 bits, a half frame indication may be represented in 1 bit, and an SSB time index may be represented in 6 bits. Herein, a part of the 10 bits of the SFN may be included in PBCH contents. Further, an NR-PBCH DMRS may include 3 bits out of the 6 bits of the SSB index.

Embodiments of a method for indicating a time index as illustrated in FIG. 15 may be given as follows.

Method 1: S2 S1 (PBCH scrambling)+S0 C0 (PBCH contents)

Method 2: S2 S1 S0 (PBCH scrambling)+C0 (PBCH contents)

Method 3: S2 S1 (PBCH scrambling)+S0 C0 (PBCH DMRS)

Method 4: S2 S1 S0 (PBCH scrambling)+C0 (PBCH DMRS)

If a half frame indication is delivered in the NR-PBCH DMRS, PBCH data may be combined, thereby achieving additional performance improvement. For this reason, a 1-bit half frame indication may be transmitted in the NR-PBCH DMRS as in Method 3 and Method 4.

In a comparison between Method 3 and Method 4, although Method 3 may reduce the number of blind decodings, Method 3 may lead to loss of PBCH DMRS performance. If the PBCH DMRS may deliver 5 bits including S0, C0, B0, B1, and B2 with excellent performance, Method 3 may be appropriate as a time indication method. However, if the PBCH DMRS may not deliver the 5 bits with excellent performance, Embodiment 4 may be appropriate as a time indication method.

In consideration of the above, 7 MSBs of an SFN may be included in the PBCH contents, and 2 or 3 LSBs of the SFN may be delivered by PBCH scrambling. Further, 3 LSBs of an SSB index may be included in the PBCH DMRS, and 3 MSBs of the SSB index may be included in the PBCH contents.

Additionally, a method for acquiring an SSB time index of a neighbor cell may be considered. Since DMRS sequence-based decoding outperforms PBCH contents-based decoding, 3 bits of an SSB index may be transmitted by changing a DMRS sequence within each 5-ms period.

Meanwhile, while an SSB time index may be transmitted only in an NR-PBCH DMRS of a neighbor cell in the frequency range at or below 6 GHz, 64 SSB indexes are distinguished by a PBCH-DMRS and PBCH contents in the frequency range at or above 6 GHz, and thus a UE does not need to decode a PBCH of the neighbor cell.

However, decoding of the PBCH-DMRS and the PBCH contents together may result in additional complexity of NR-PBCH decoding, and reduced PBCH decoding performance, compared to use of the PBCH-DMRS only. Accordingly, it may be difficult to perform PBCH decoding to receive an SSB of the neighbor cell.

In this context, it may be considered that a serving cell provides a configuration related to an SSB index of a neighbor cell, instead of decoding the PBCH of the neighbor cell. For example, the serving cell provides a configuration for 3 MSBs of an SSB index of a target neighbor cell, and the UE detects 3 LSBs from a PBCH-DMRS. Then, the SSB index of the target neighbor cell may be acquired by combining the 3 MSBs with the 3 LSBs.

10. Measurement Result Evaluation

Now, a description will be given of the results of performance measurement according to a payload size, a transmission scheme, and a DMRS. It is assumed that two OFDM symbols having 24 RBs are used for NR-PBCH transmission. It is also assumed that an SS burst set (i.e., 10, 20, 40, or 80 ms) may have a plurality of periods, and encoded bits are transmitted within 80 ms.

(3) DMRS Density

Figure 16:
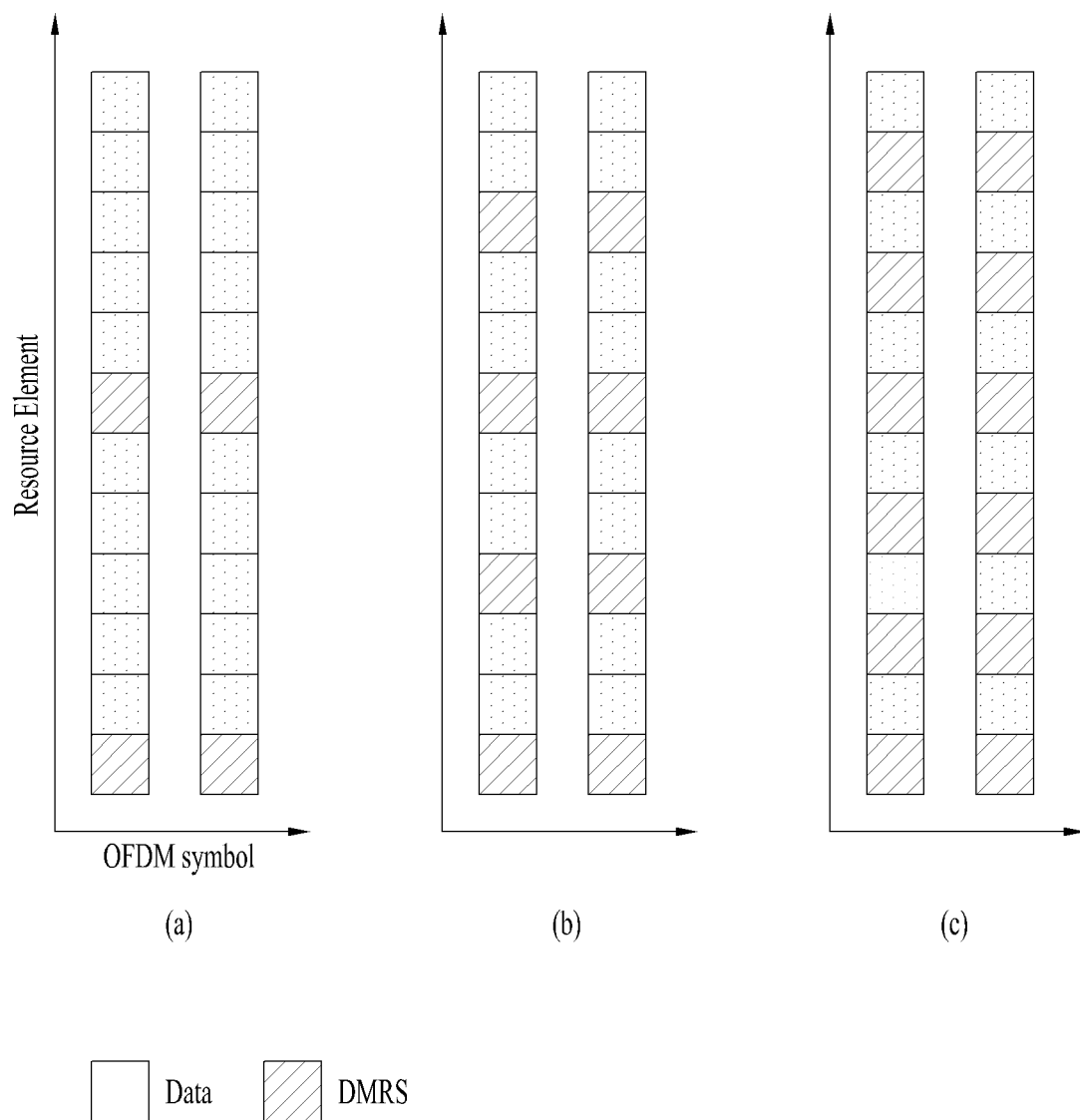
FIGS. 16 to 33 are views illustrating performance measurement results according to an embodiment of the present disclosure.

In a low SNR area, improvement of channel estimation performance is a significant factor in improving demodulation performance. However, if the RS density of the NR-PBCH increases, the channel estimation performance is improved, but the coding speed is reduced. Therefore, for balancing between the channel estimation performance and the channel coding gain, decoding performance for different DMRS densities is compared. FIG. 16 is an exemplary view illustrating DMRS densities.

FIG. 16(a) illustrates use of 2 REs per symbol for the DMRS, FIG. 16(b) illustrates use of 4 REs per symbol for the DMRS, and FIG. 16(c) illustrates use of 6 REs per symbol for the DMRS. In addition, the present evaluation is based on the assumption of using a single port-based transmission scheme (i.e., TD-PVS).

FIG. 16 illustrates embodiments of a DMRS pattern for single antenna port-based transmission. Referring to FIG. 16, with the positions of DMRSs equally distant from each other in the frequency domain, the RS density is changed. Further, FIG. 17 is a view illustrating performance results for the different DMRS densities.

Figure 17:
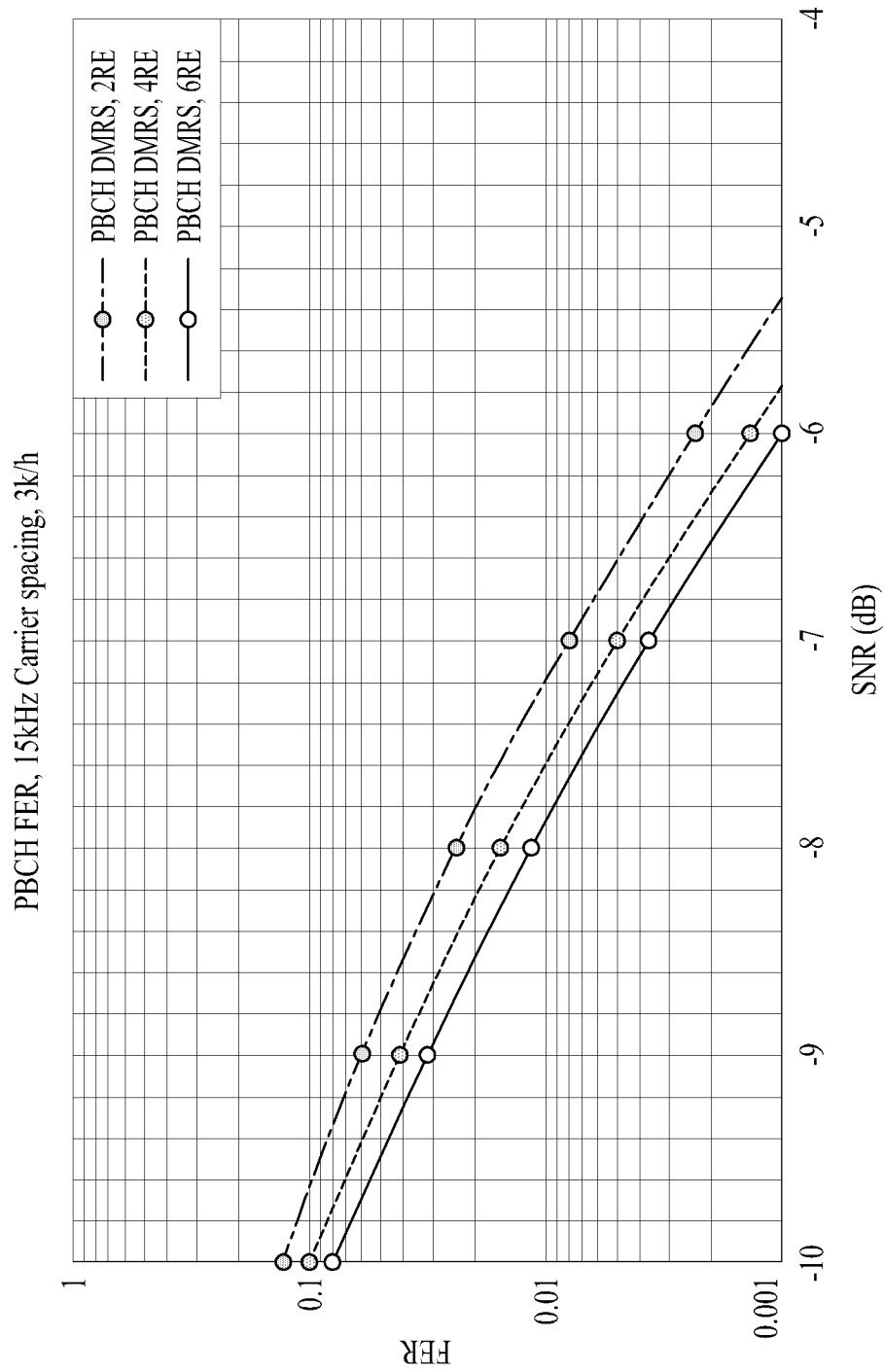

As illustrated in FIG. 17, the NR-PBCH decoding performance in the case illustrated in FIG. 16(b) is better than in the case illustrated in FIG. 16(a), due to excellent channel estimation performance. Meanwhile, the case of FIG. 16(c) has the effect of a coding speed loss larger than the gain of channel estimation performance improvement, and thus has poor performance, compared to the case of FIG. 16(b). For this reason, it seems most appropriate to design the DMRS with an RS density of 4 REs per symbol.

(4) DMRS Time Position and CFO Estimation

A description will be given of the detection performance of an SSB index according to the number of DMRS sequence hypotheses, a modulation type, sequence generation, and DMRS RE mapping. The present measurement results are based on the assumption that two OFDM symbols in 24 RBs are used for NR-PBCH transmission. In addition, multiple periods may be considered for an SS burst set, and may be 10 ms, 20 ms, or 40 ms.

(5) Number of DMRS Sequence Hypotheses

Figure 18:
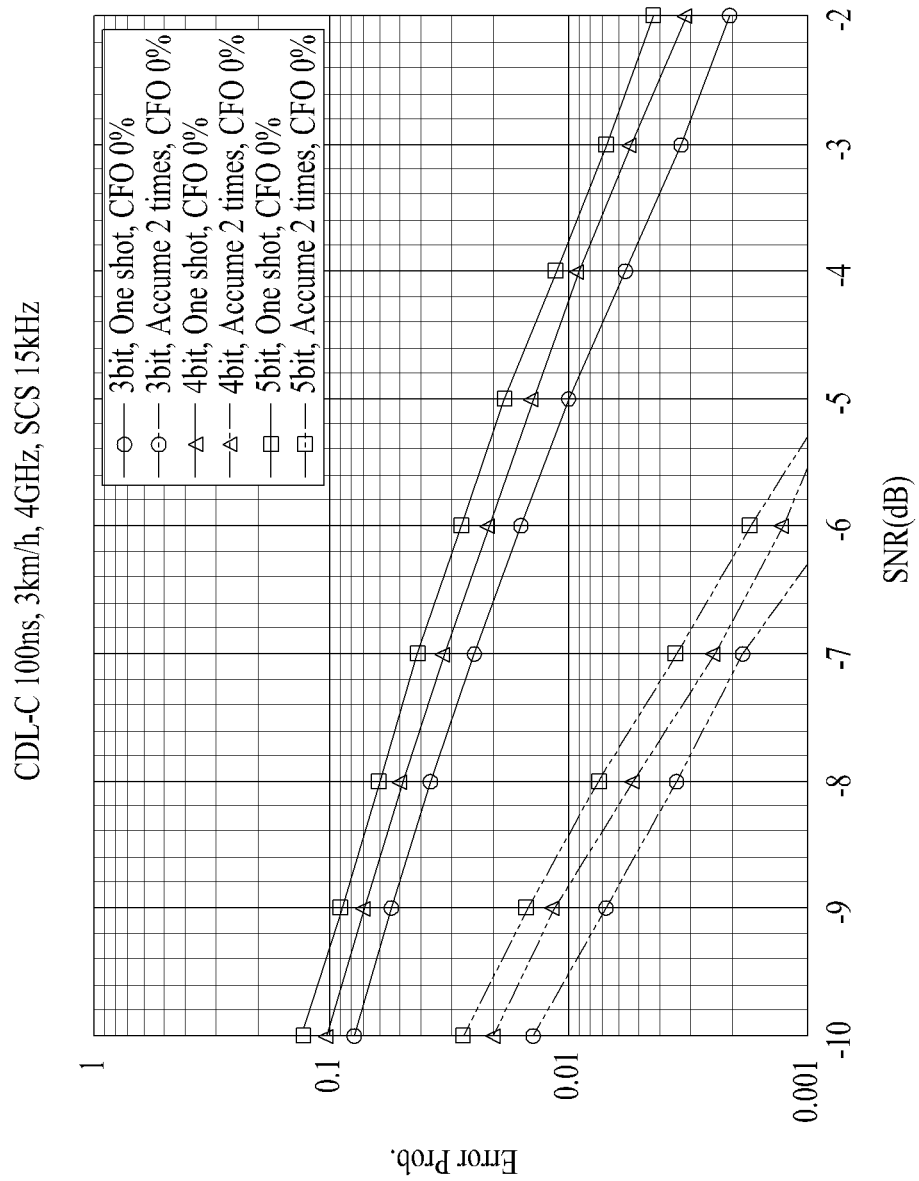

FIG. 18 illustrates measurement results according to SSB indexes. 144 REs and 432 REs are used for the DMRS and data, respectively in 24 RBs and two OFDM symbols. It is assumed that a long sequence (e.g., a Gold sequence of length 31) and QPSK are used for a DMRS sequence.

Referring to FIG. 18, when measurement is performed with the detection performance of 3 to 5 bits accumulated twice, an error rate of 1% is shown at −6 dB. Therefore, information of 3 to 5 bits may be used to represent the number of hypotheses for a DMRS sequence in terms of detection performance.

(6) Modulation Type

Figure 19:
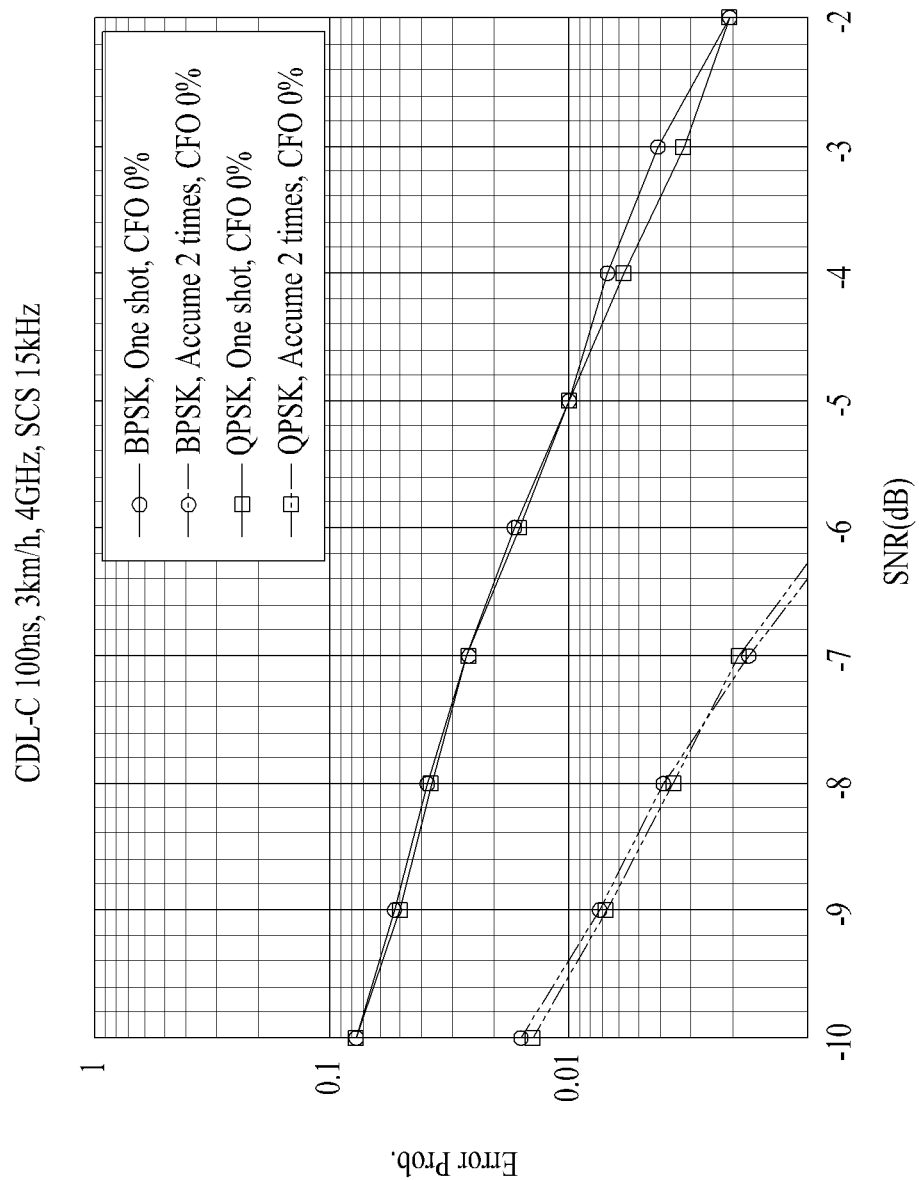
Figure 20:
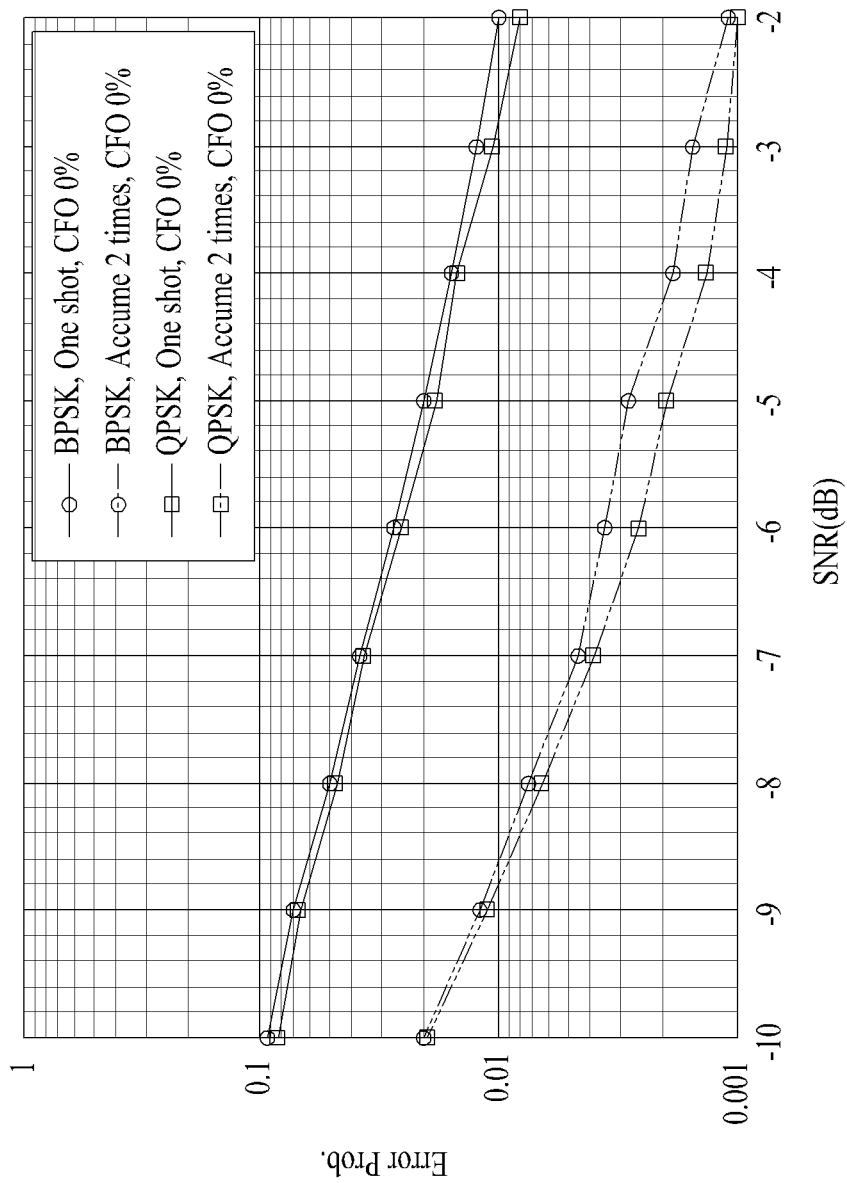

FIGS. 19 and 20 illustrate the results of performance measurement in BPSK and QPSK. In the present test, a DMRS hypothesis is represented in 3 bits, a DMRS sequence is based on a long sequence, and the power level of an interference TRP is equal to the power level of a serving TRP.

Referring to FIGS. 19 and 20, it may be noted that BPSK and QPSK are similar in performance. Therefore, use of any modulation type for modulation of a DMRS sequence does not bring much difference in terms of performance measurement. However, referring to FIG. 21, it may be noted that BPSK and QPSK differ in correlation characteristics.

Figure 21:
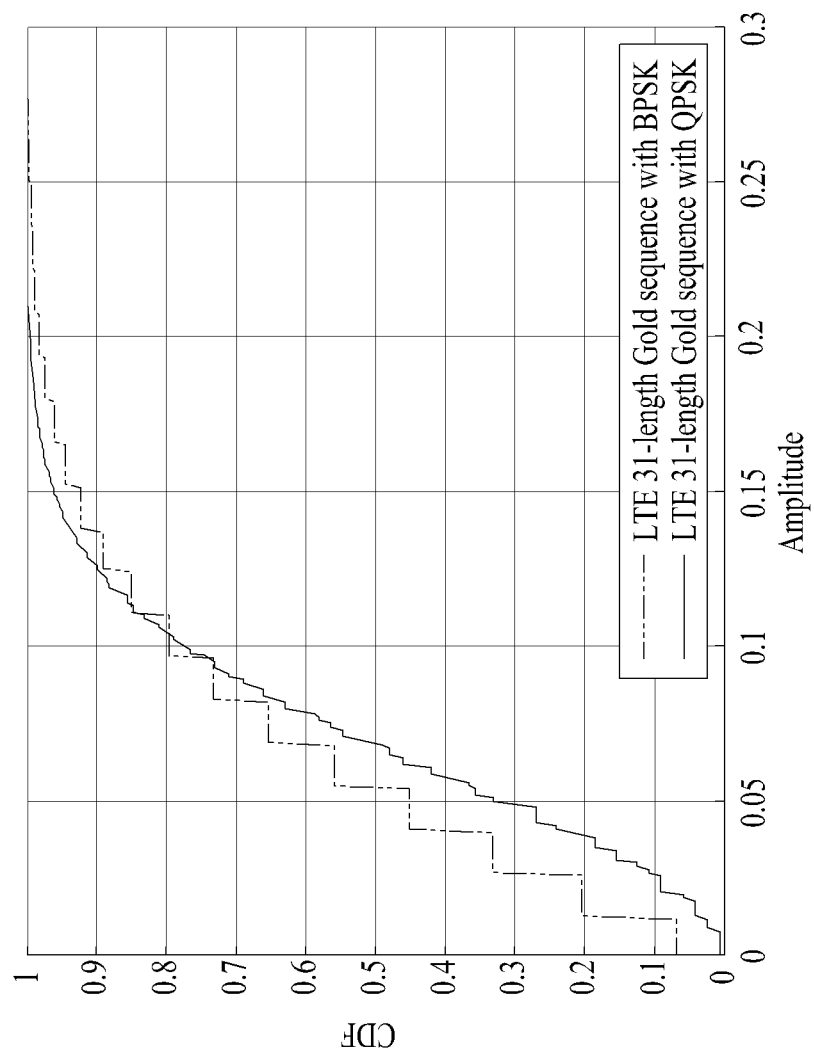

Referring to FIG. 21, BPSK is more distributed than QPSK, in an area with a correlation amplitude equal to or larger than 0.1. Accordingly, QPSK is preferably used as a modulation type for the DMRS in consideration of a multi-cell environment. That is, QPSK is a more appropriate modulation type for the DMRS sequence, in terms of correlation characteristics.

(7) Generation of PBCH DMRS Sequence

Figure 22:
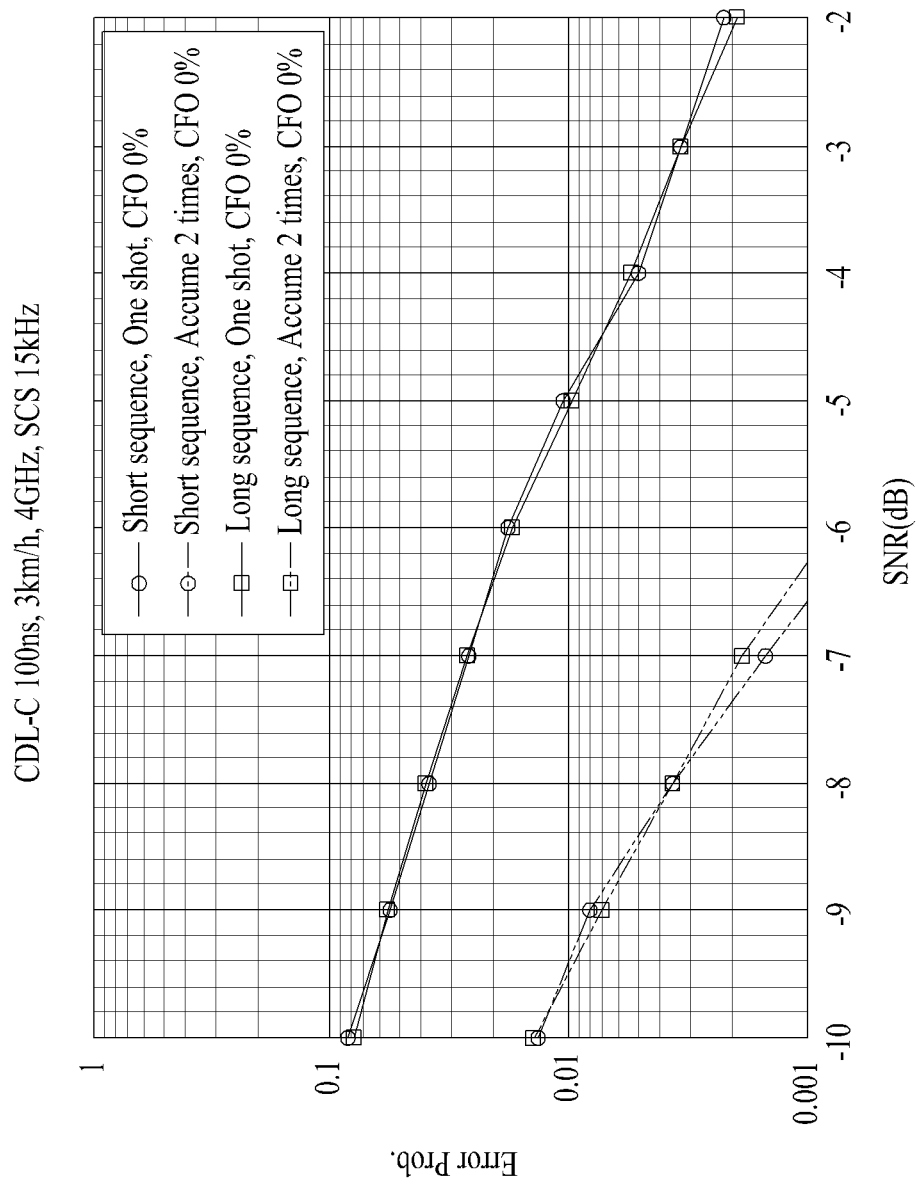
Figure 23:
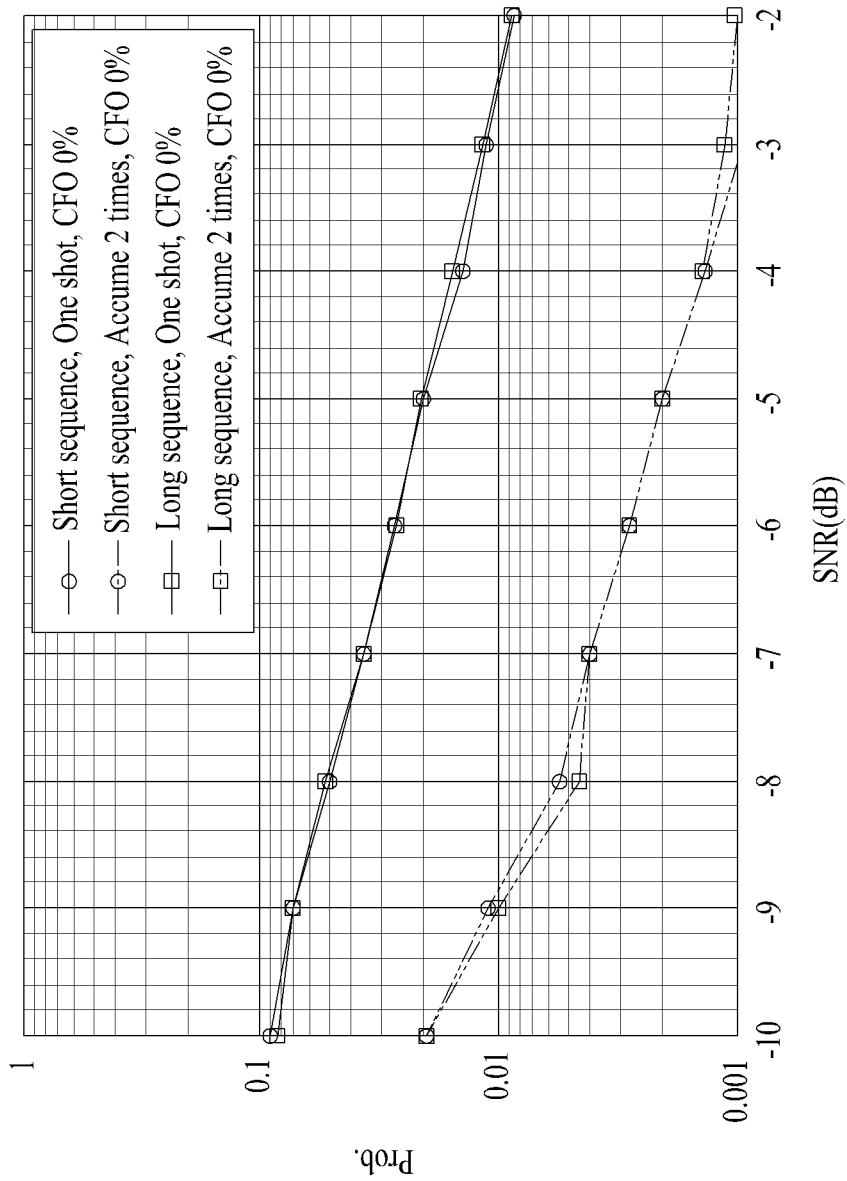

FIGS. 22 and 23 illustrate measurement results according to DMRS sequence generation. A DMRS sequence may be generated on the basis of a long sequence with a polynomial order of 30 or higher, or a short sequence of a polynomial order of 8 or less. In addition, it is assumed that a DMRS hypothesis is 3 bits, and the power level of an interference TRP is equal to that of a serving TRP.

Referring to FIGS. 22 and 23, it may be noted that the detection performance of short sequence-based generation is similar to the detection performance of long sequence-based generation.

Specifically, although the correlation performance of a first M-sequence is intended to be increased by introducing a polynomial expression of length 7, no difference is made from conventional use of a length–31 polynomial expression for a first M-sequence. In addition, while a sequence is generated by setting the initial value of the first M-sequence to an SSBID, it does not make any difference from a conventional scheme of fixing the first M-sequence and using an SSBID-CellID for the second M-sequence.

Accordingly, a length–31 Gold sequence is used as in LTE, and initialization is performed by fixing the initial value of the first M-sequence and using SSBID-CellID for the second M-sequence, as is done conventionally.

(8) DMRS RE Mapping

Figure 24:
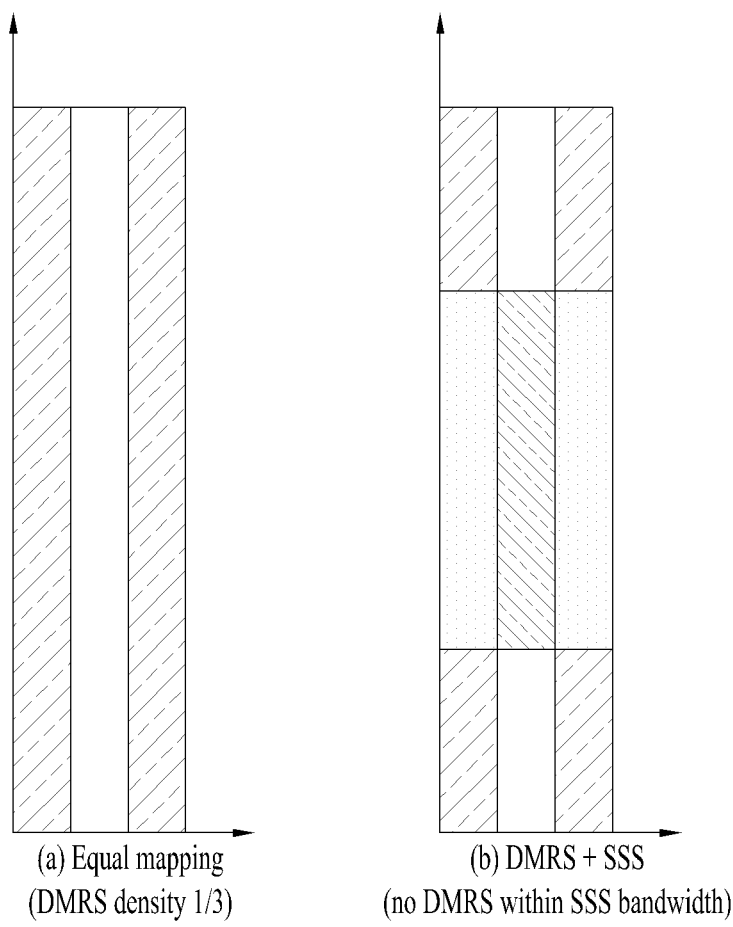
Figure 25:
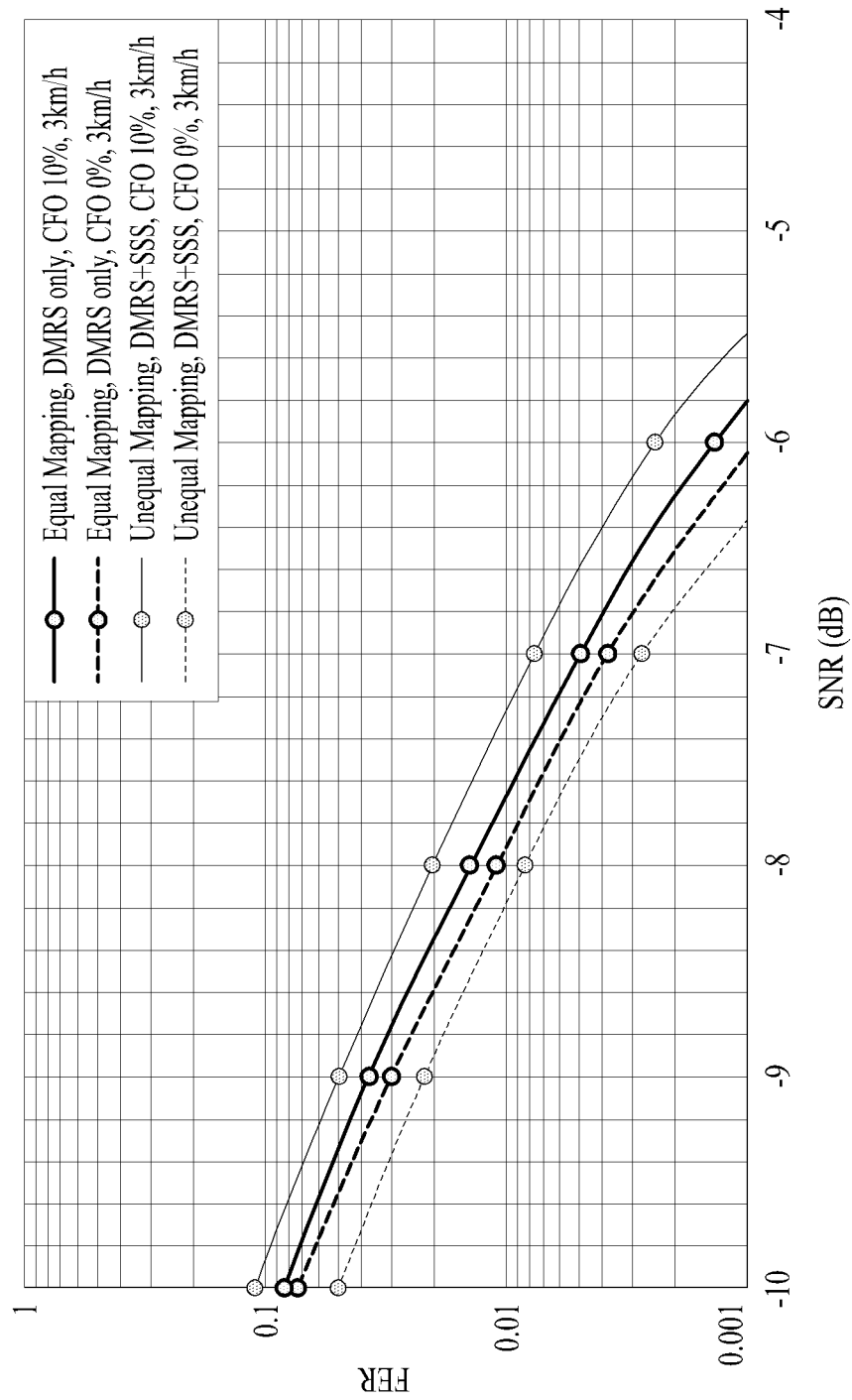
Figure 26:
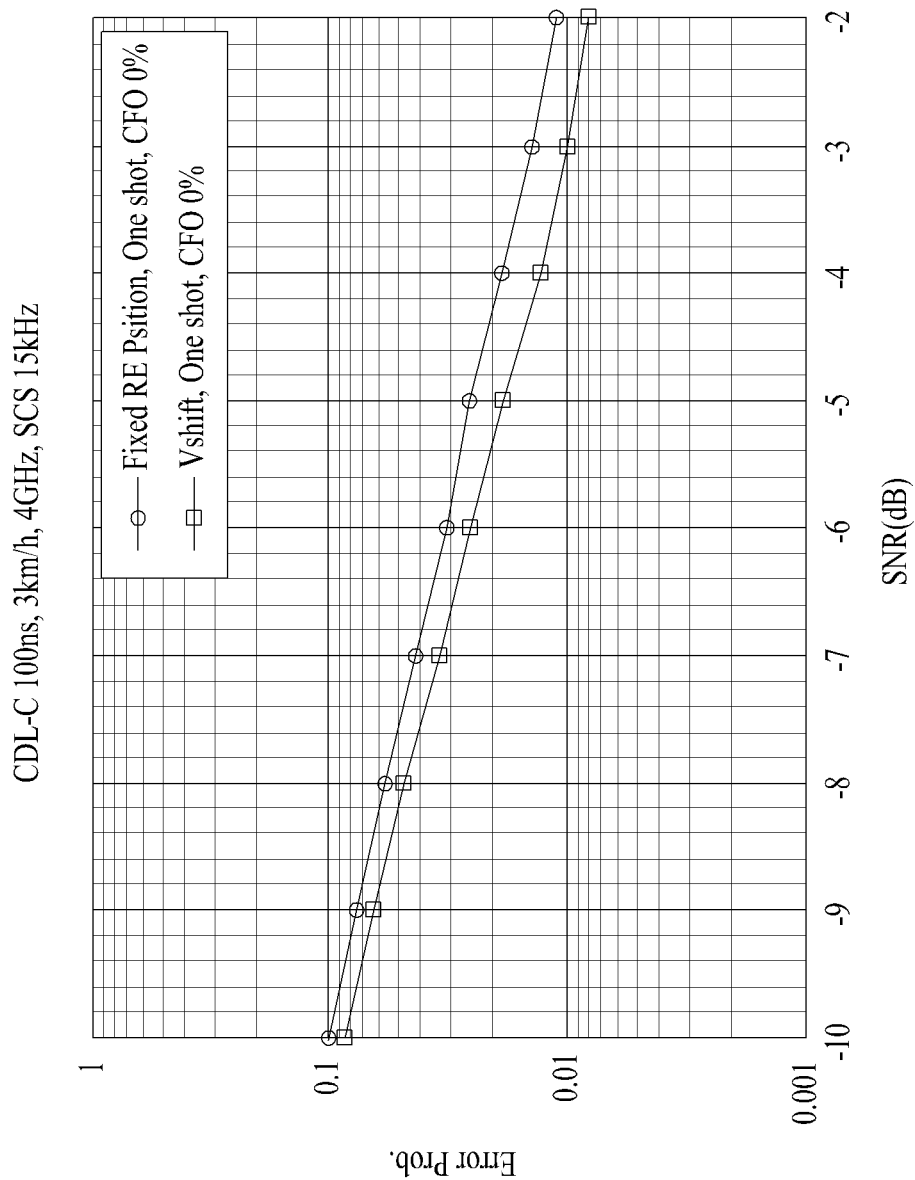

FIGS. 24, 25 and 26 illustrate the results of performance measurement according to the equidistant RE mapping method and the non-equidistant RE mapping method. Herein, a DMRS hypothesis is 3 bits, a DMRS sequence is based on a long sequence, and the power level of an interference TRP is equal to that of a serving TRP. In addition, only one interference source exists.

Further, the NR-SSS is mapped to 144 REs (i.e., 12 RBs), and the NR-PBCH is mapped to 288 REs (i.e., 24 RBs). Meanwhile, in the non-equidistant mapping method, it is assumed that the NR-SSS is used for PBCH demodulation, and the PBCH DMRS is not mapped within an NR-SSS transmission bandwidth. Further, it is assumed that a residual CFO exists.

That is, the above-described contents are summarized as follows.

(Equidistant DMRS mapping) 96 REs per PBCH symbol, that is, a total of 192 REs are used.

(Non-equidistant DMRS mapping) a DMRS sequence is mapped to subcarriers outside the NR-SSS transmission bandwidth. In this case, the NR-SSS is used for PBCH demodulation. In addition, 48 REs per PBCH symbol, and 128 REs for the NR-SSS symbol, that is, a total of 224 REs are used.

As noted from FIG. 25, the non-equidistant mapping scheme without a CFO includes more REs for channel estimation, thus outperforming the equidistant mapping scheme. However, if 10% of a residual CFO exists, the performance of the non-equidistant mapping scheme decreases, whereas the equidistant mapping scheme exhibits a similar performance irrespective of a CFO. Even though the non-equidistant mapping scheme has more REs for channel estimation, the channel estimation accuracy of the NR-SSS symbol is decreased due to the residual CFO. Therefore, it may be noted that in the presence of a residual CFO, the equidistant mapping scheme outperforms the non-equidistant mapping scheme in channel estimation performance.

As noted from FIG. 26, the use of variable RE mapping may bring about the effect of interference randomization. Therefore, the detection performance of variable RE mapping is higher than that of fixed RE mapping.

Figure 27:
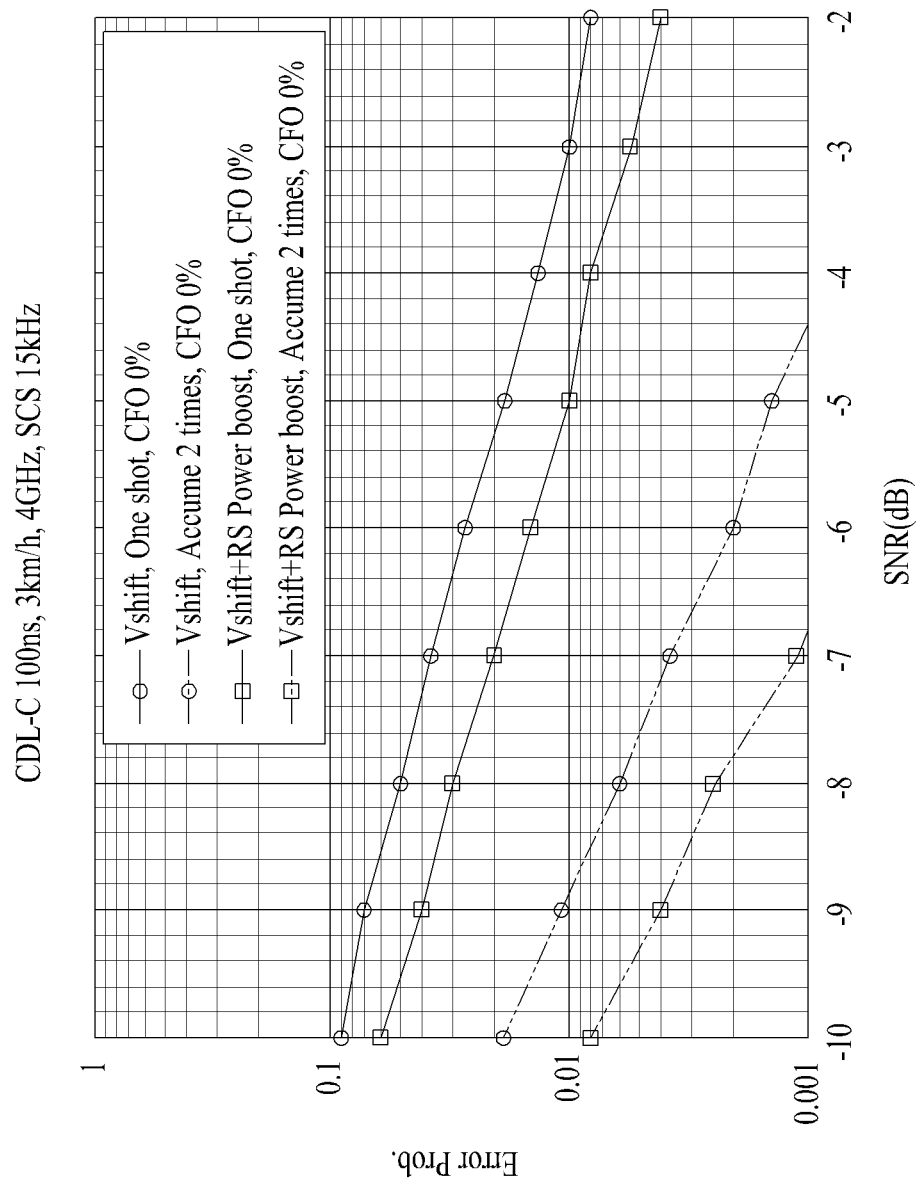

FIG. 27 illustrates measurement results when RS power boosting is used. Herein, it is assumed that the RE transmission power for a DMRS is higher than the RE transmission power for PBCH data by about 1.76 dB (=10 log(1.334/0.889)). If variable RE mapping and DMRS power boosting are used together, other cell interference is reduced. As noted from FIG. 27, there is a performance gain of 2 to 3 dB with RS power boosting, compared to the absence of RS power boosting.

Figure 28:
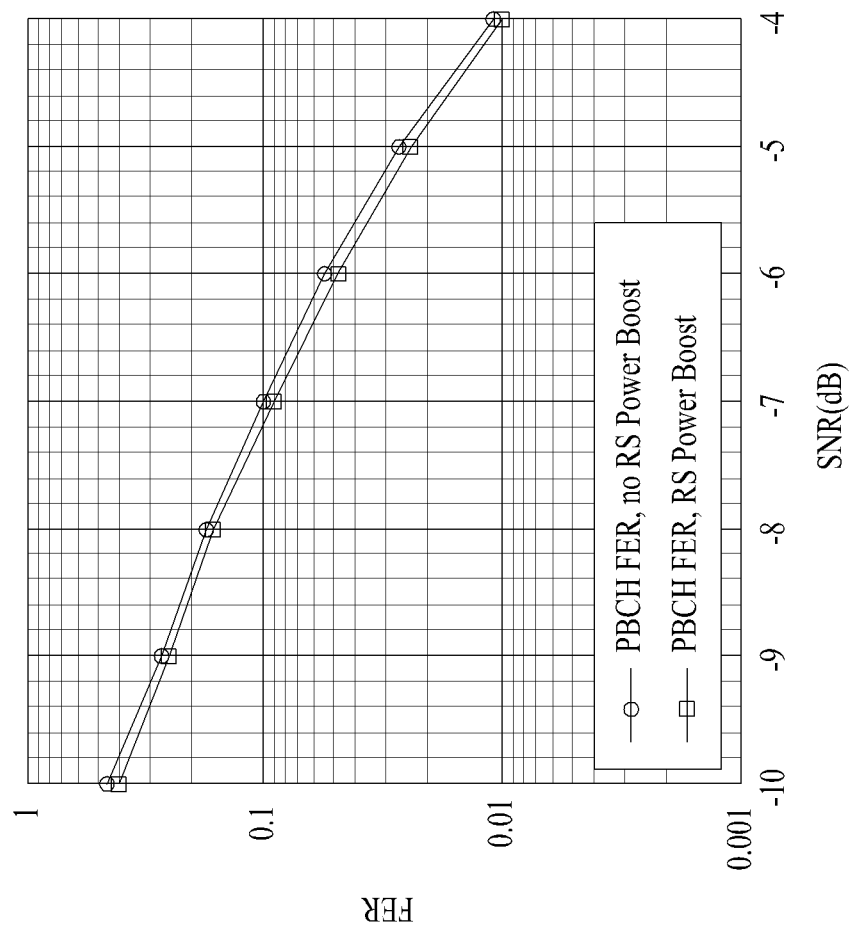
Figure 29:
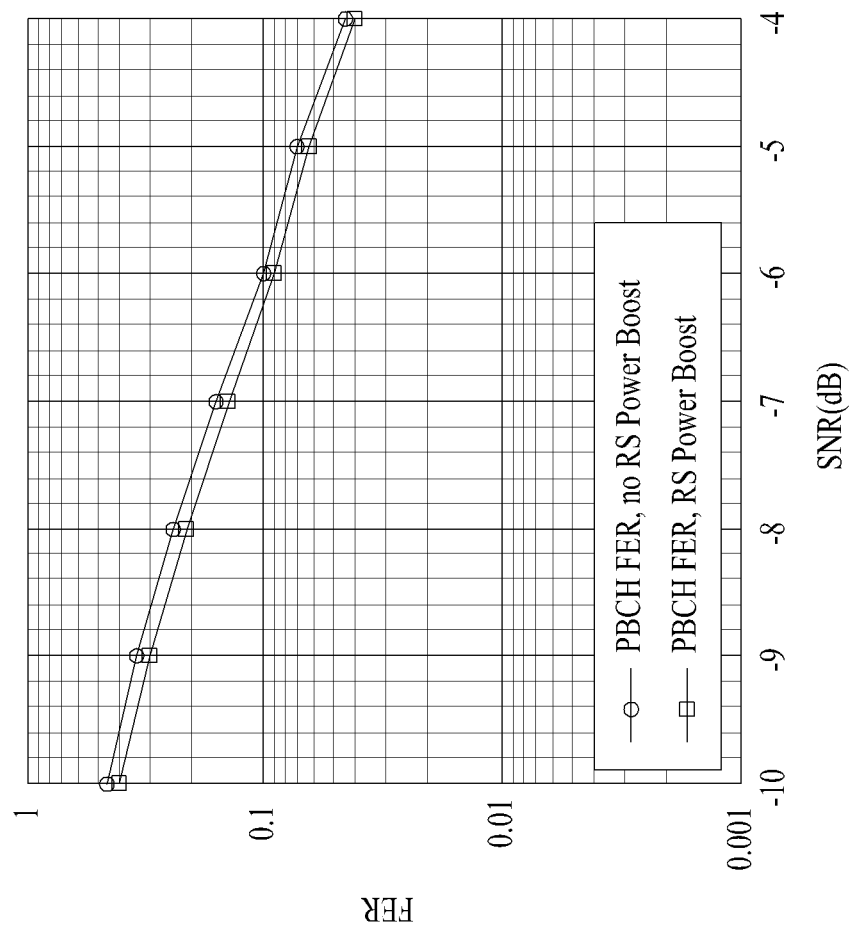
Figure 30:
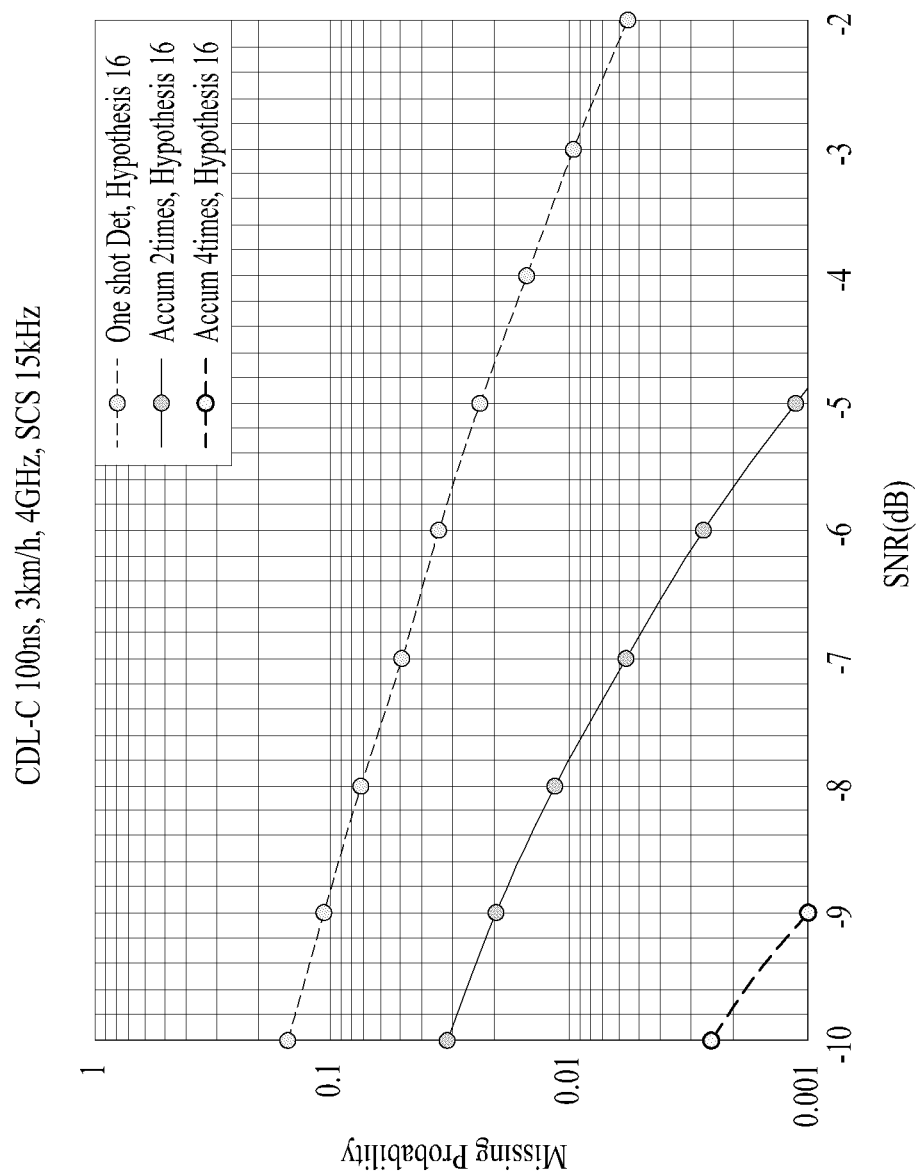
Figure 31:
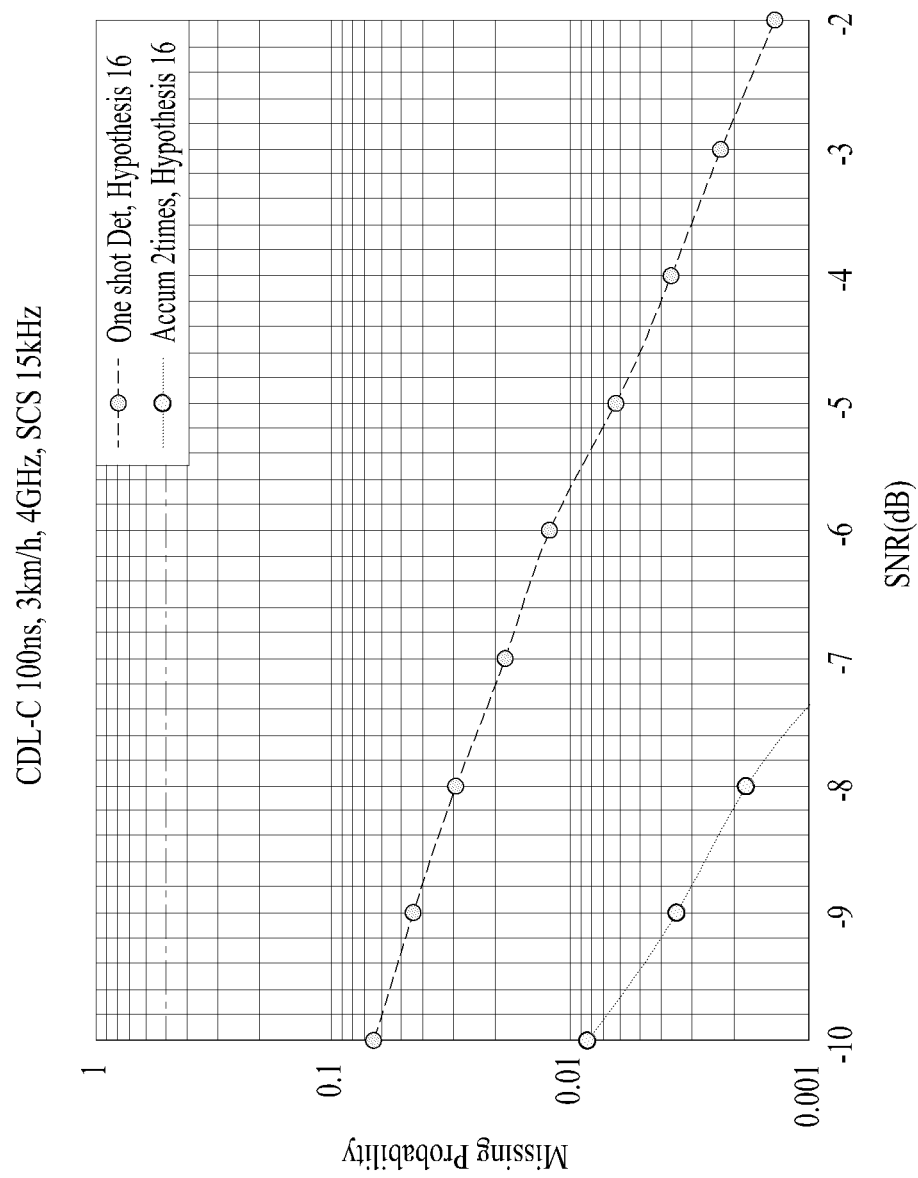

On the other hand, the RS power boosting reduces the RE transmission power for PBCH data. Thus, the RS power boosting may affect PBCH performance. FIGS. 28 and 29 illustrate the results of measuring PBCH performance in the cases of RS power boosting and no RS power boosting. It is assumed that the period of an SS burst set is 40 ms and encoded bits are transmitted within 80 ms.

The reduction of the RE transmission power for PBCH data may cause performance loss. However, the resulting RS power increase improves channel estimation performance, thereby improving demodulation performance. Accordingly, as noted from FIGS. 28 and 29, the performance is almost the same in both cases. Accordingly, the effect of the loss of the RE transmission power for PBCH data may be compensated for by a channel estimation performance gain.

[Table 3] below lists assumed values for parameters used for the above performance measurement.

TABLE 3

| Parameter | Value |
| --- | --- |
| Carrier Frequency | 4 GHz |
| Channel Model | CDL_C (delay scaling values: 100 ns) |
| Subcarrier Spacing | 15 kHz |
| Antenna Configuration | TRP: (1, 1, 2) with Omni-directional antenna element |
| | UE: (1, 1, 2) with Omni-directional antenna element |
| Frequency Offset | 0% and 10% of subcarrier spacing |
| Default period | 20 ms |
| Subframe duration | 1 ms |
| OFDM symbols in SF | 14 |
| Number of interfering TRPs | 1 |
| Operating SNR | −6 dB |

(9) SSB Index Indication

Evaluation results for comparing the performance of an SSB time index indication will be described with reference to FIGS. 30 to 33. For the present evaluation, a method for indicating an SSB time index by a PBCH DMRS sequence, and a method for indicating an SSB index by PBCH contents are considered. It is assumed that for an SSB time index and 5-ms slot boundary indication, there are a total of 16 states, that is, the indication is represented in 4 bits. In this evaluation, it is assumed that a single SSB of an SS burst set is transmitted, and time-domain precoder cycling is applied within a PBCH TTI. In addition, it is assumed that 192 REs are used for the PBCH DMRS, and the bit size of an MIB including a CRC is 64 bits.

The number of hypotheses is 16 for this evaluation. This is because 4 bits are required to represent 8 states for an SSB index and states for a 5 ms boundary in the PBCH DMRS. As noted from FIGS. 30 and 31, the detection performance of an SSB time index in the PBCH DMRS reaches 0.2% at an SNR of −6 dB, when accumulated twice. As observed from this evaluation, it is more preferable to use the PBCH DMRS in indicating an SSB index and a 5 ms boundary.

Figure 32:
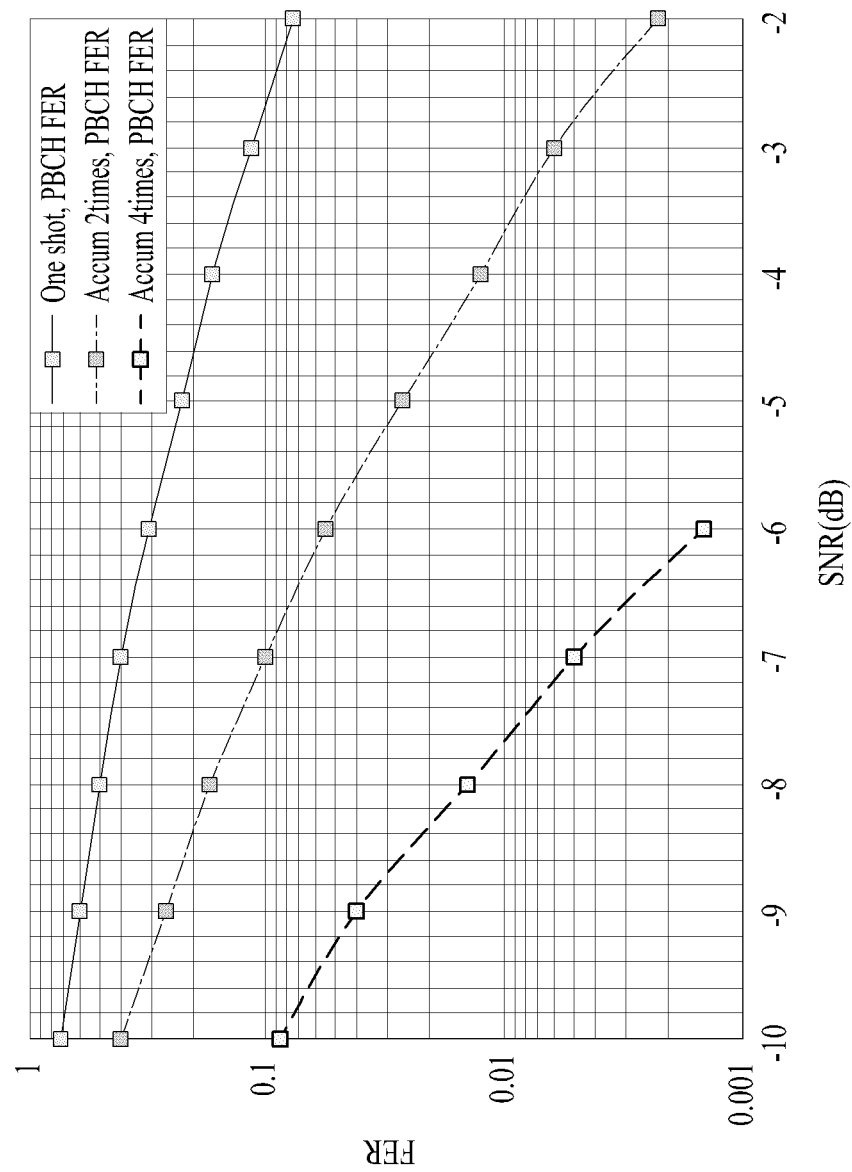
Figure 33:
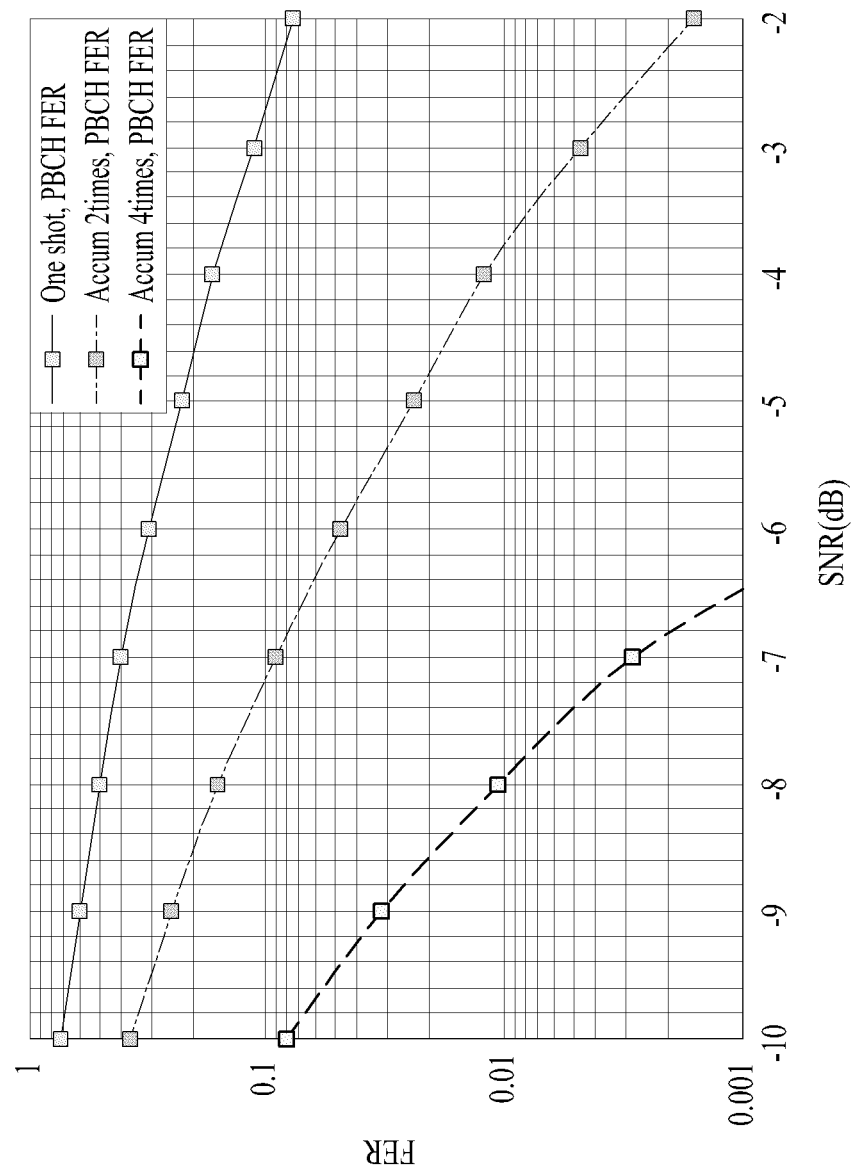

On the other hand, as noted from FIGS. 32 and 33, even though decoding is performed with accumulation twice, a PBCH FER of 1% cannot be achieved at the SNR of −6 dB. Therefore, if an SSB time index is defined only in PBCH contents, the detection performance of the SSB time index may not be sufficient.

[Table 4] below lists parameter values assumed for the above evaluation of an SSB index indication.

TABLE 4

| Parameter | Value |
| --- | --- |
| Carrier Frequency | 2 GHz |
| Channel Model | CDL_C (delay scaling raises: 300 ns) |
| System Bandwidth | 24 RBs |
| Number of OFDM symbol for PBCH | 2 symbols |
| REs for DMRS and Data | 192 (96 × 2) for DMRS, 384 (192 × 2) for Data |
| Payload size | 72 bits, 64 bits, 56 bits, 48 bits |
| PBCH TTI | 80 ms |
| SS burst set periodicity | 20 ms |
| PBCH Repetition | 4 times within PBCH TTI |
| Subcarrier Spacing | 15 kHz |
| Antenna Configuration | 2Tx & 2Rx |
| Transmission Scheme | Time Domain Precoder Vector Switching (TD-PVS) |
| Channel Estimation | Non-ideal |
| Modulation Order | QPSK |
| Coding Scheme | TBCC |

11. BWP (Bandwidth Part) for DL Common Channel Transmission

The initial access procedure of LTE is performed within a system bandwidth configured by an MIB. Further, the PSS/SSS/PBCH is aligned with respect to the center of the system bandwidth. A common search space is defined within the system bandwidth, system information is delivered on a PDSCH in the common search space allocated within the system bandwidth, and an RACH procedure for Msg 1/2/3/4 is performed.

Meanwhile, while the NR system supports an operation within a wideband component carrier (CC), it is very difficult in terms of cost to configure a UE to have the capability of performing a necessary operation within all wideband CCs. Accordingly, it may be difficult to implement a reliable initial access procedure within a system bandwidth.

Figure 34:
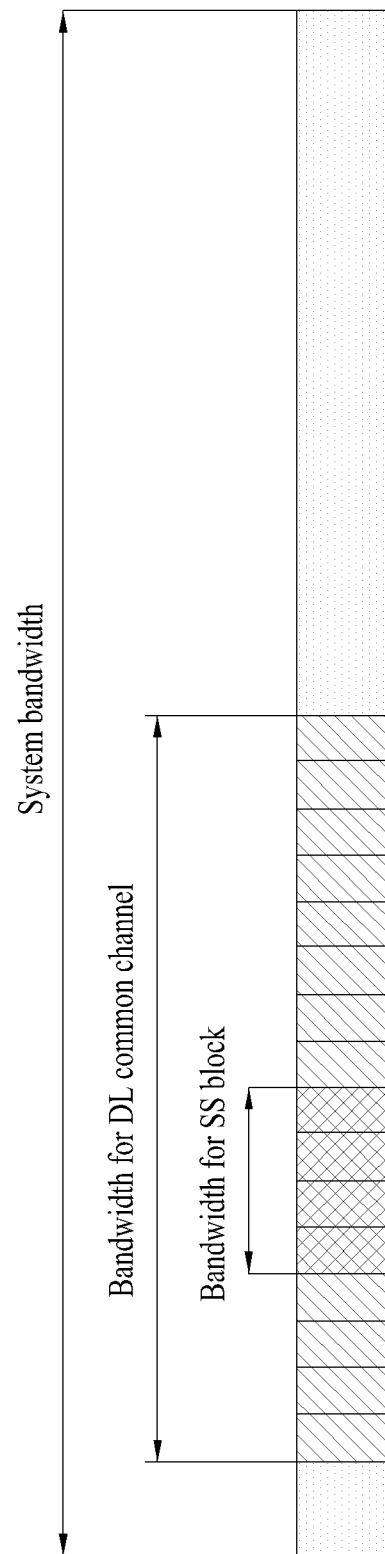
FIGS. 34 to 36 are views referred to for describing embodiments of configuring a bandwidth for a DL common channel.

To avert this problem, a BWP may be defined for an initial access procedure in NR, as illustrated in FIG. 34. In the NR system, an initial access procedure for SSB transmission, system information delivery, paging, and an RACH procedure may be performed within a BWP corresponding to each UE. Further, at least one DL BWP may include one CORESET having a common search space in at least one primary CC.

Thus, DL control information related to at least RMSI, OSI, paging, and RACH message 2/4 may be transmitted in a CORESET having a common search space, and a DL data channel related to the DL control information may be allocated within a DL BWP. Further, the UE may expect that an SSB will be transmitted in a BWP corresponding to the UE.

That is, at least one DL BWP may be used for transmission of a DL common channel in NR. Herein, an SSB, a CORESET and RMSI with a common search space, OSI, paging, and a PDSCH for RACH Msg 2/4 may be included in the DL common channel. The RMSI may be interpreted as system information block 1 (SIB 1), which is system information that the UE should acquire after receiving an MIB on a PBCH.

(1) Numerology

In NR, the subcarrier spacings of 15, 30, 60 and 120 kHz are used for data transmission. Therefore, a numerology for a PDCCH and a PDSCH within an BWP for a DL common channel may be selected from among numerologies defined for data transmission. For example, one or more of the subcarrier spacings of 30, 60 and 60 kHz may be selected for a frequency range at or below 6 GHz, whereas one or more of the subcarrier spacings of 60 and 120 kHz may be selected for a frequency range of 6 GHz to 52.6 kHz.

However, since the 60-kHz subcarrier spacing is already defined for URLLC service in the frequency range at or below 6 GHz, the 60-kHz subcarrier spacing is not suitable for PBCH transmission in the frequency range at or below 6 GHz. Accordingly, for transmission of a DL common channel, the subcarrier spacings of 15 kHz and 30 kHz may be used in the frequency range at or below 6 GHz, and the subcarrier spacings of 60 kHz and 120 kHz may be used in the frequency range at or above 6 GHz.

Meanwhile, the subcarrier spacings of 15, 30, 120 and 240 kHz are supported for SSB transmission in NR. It may be assumed that the same subcarrier spacing is applied to downlink channels for an SSB, a CORESET and RMSI with a common search space, paging, and a PDSCH for an RAR. Therefore, if this assumption is applied, there is no need for defining numerology information in PBCH contents.

On the other hand, it may occur that a subcarrier spacing for a DL control channel needs to be changed. For example, if the 240-kHz subcarrier spacing is applied to SSB transmission in the frequency band at or above 6 GHz, the 240-kHz subcarrier spacing is not used for data transmission including DL control channel transmission, and thus the subcarrier spacing needs to be changed for data transmission including DL control channel transmission. Thus, if the subcarrier spacing can be changed for data transmission including DL control channel transmission, this may be indicated by a 1-bit indicator included in the PBCH contents. For example, the 1-bit indicator may be interpreted as indicating {15 kHz, 30 kHz} or {60 kHz, 120 kHz} according to a carrier frequency range. In addition, the indicated subcarrier spacing may be regarded as a reference numerology for an RB grid. The PBCH contents may mean an MIB transmitted on the PBCH.

That is, in the frequency range at or below 6 GHz, the 1-bit indicator may indicate that the subcarrier spacing for RMSI or OSI, paging, and Msg 2/4 for initial access is 15 kHz or 30 kHz, whereas in the frequency range at or above 6 GHz, the 1-bit indicator may indicate that the subcarrier spacing for RMSI or OSI, paging, and Msg 2/4 for initial access is 60 kHz or 120 kHz.

(2) Bandwidth of BWP for Transmission of DL Common Channel

In the NR system, the bandwidth of a BWP for a DL common channel does not need to be equal to a system bandwidth in which the network operates. That is, the bandwidth of the BWP may be narrower than the system bandwidth. That is, although the bandwidth should be wider than a minimum carrier bandwidth, the bandwidth should not be wider than a minimum UE bandwidth.

Therefore, a BWP for transmission of a DL common channel may be defined such that the bandwidth of the BWP is wider than the bandwidth of an SSB, and equal to or less than a specific DL bandwidth of every UE operable in each frequency range. For example, the minimum carrier bandwidth may be defined as 5 MHz and the minimum UE bandwidth may be assumed to be 20 MHz in the frequency range at or below 6 GHz. In this case, the bandwidth of the DL common channel may be defined in a range of 5 MHz to 20 MHz. That is, an SSB may be located in a part of the bandwidth of the DL common channel.

(3) Bandwidth Configuration

Figure 35:
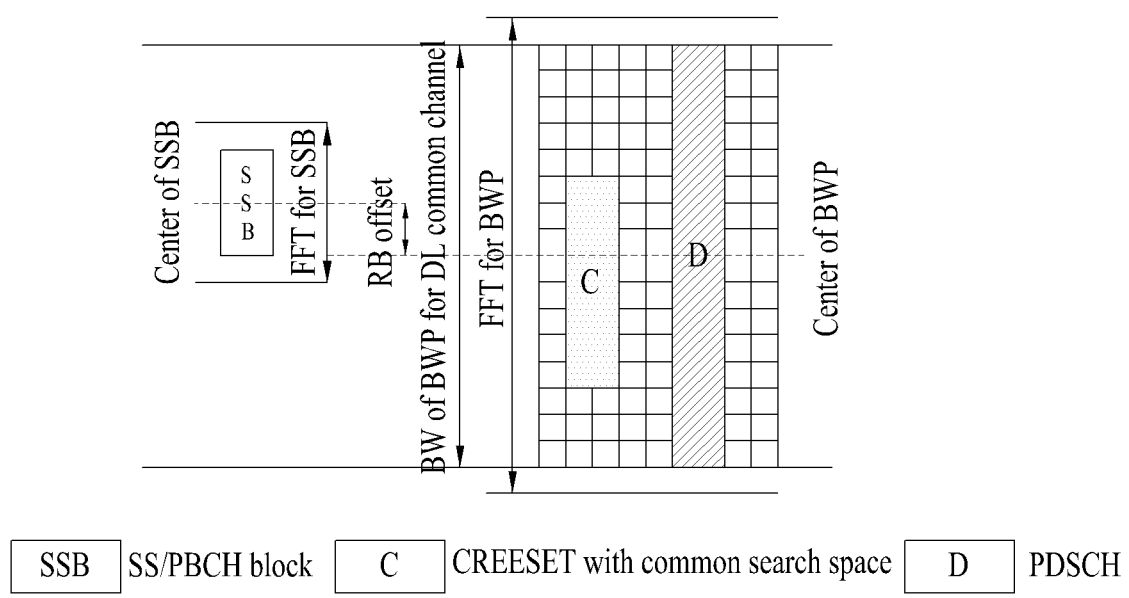

FIG. 35 illustrates an exemplary bandwidth configuration.

The UE attempts to detect a signal within the bandwidth of an SSB in an initial synchronization procedure including cell ID detection and PBCH decoding. Then, the UE may continue a subsequent initial access procedure within the bandwidth of a DL common channel, indicated by the network in PBCH contents. That is, the UE may acquire system information within the bandwidth of the DL common channel, and perform an RACH procedure.

Meanwhile, an indicator indicating a relative frequency position between the bandwidth of the SSB and the bandwidth of the DL common channel may be defined in the PBCH contents. Meanwhile, as described above, the PBCH contents may mean an MIB transmitted on the PBCH. For example, as illustrated in FIG. 35, the relative frequency position between the bandwidth of the DL common channel and the bandwidth of the SSB may be defined by offset information about the spacing between the bandwidth of the SSB and the bandwidth of the DL common channel.

Particularly, referring to FIG. 35, the offset value may be indicated in RBs, and the UE may determine that the bandwidth of the DL common channel is located at an offset position corresponding to an indicated number of RBs. Meanwhile, different numerologies, that is, different subcarrier spacings may be configured for the bandwidth of the SSB and the bandwidth of the DL common channel. Herein, the absolute frequency spacing of an offset indicated in RBs may be calculated with respect to either of the subcarrier spacing for the SSB bandwidth and the subcarrier spacing for the bandwidth of the DL common channel.

Further, to simplify the indication of a relative frequency position, a bandwidth for a plurality of SSBs may be one of candidate positions for an SSB within the bandwidth of the DL common channel.

Further, the bandwidth of the DL common channel does not need to be equal to the system bandwidth in which the network operates in the NR system. In addition, the bandwidth may be narrower than the system bandwidth. That is, although the bandwidth of the DL common channel should be wider than the minimum carrier bandwidth, it should not be wider than the minimum bandwidth of the UE. For example, if it is assumed that in the frequency range at or below 6 GHz, the minimum carrier bandwidth is defined as 5 MHz and the minimum bandwidth of the UE is assumed to be 20 MHz, the bandwidth of the DL common channel may be defined within a range of 5 MHz to 20 MHz.

For example, if the bandwidth of an SSB is 5 MHz and the bandwidth of the DL common channel is 20 MHz, four candidate positions in which an SSB is to be detected may be defined within the bandwidth of the DL common channel.

12. CORESET Configuration (1) CORESET Information and RMSI Scheduling Information It may be more efficient for the network to transmit CORESET information including RMSI scheduling information to the UE than to directly indicate the RMSI scheduling information. That is, frequency resource-related information such as a bandwidth for a CORESET and a frequency position may be indicated in PBCH contents. Further, time resource-related information such as a starting OFDM symbol, a duration, and the number of OFDM symbols may be additionally configured in order to flexibly use network resources.

In addition, information about a period, a duration, and an offset for common search space monitoring may be transmitted to the UE by the network in order to reduce the detection complexity of the UE.

Meanwhile, a transmission type and an REG bundling size may be fixed according to the CORESET of a common search space. Herein, transmission types may be classified depending on whether a transmitted signal is interleaved.

(2) Number of OFDM Symbols Included in Slot

In relation to the number of OFDM symbols in a slot or a carrier frequency range at or below 6 GHz, two candidates, that is, 7-OFDM symbol slot and 14-OFDM symbol slot are considered. If it is determined in the NR system to support the two types of slots in the carrier frequency range at or below 6 GHz, a method for indicating a slot type should be defined in order to indicate the time resources of a CORESET with a common search space.

(3) Bit Size of PBCH Contents

About 14 bits may be set to represent a numerology, a bandwidth, and CORESET information in PBCH contents.

TABLE 5

| Details | Bit size | |
|---|---|---|
| | 6 GHz | For a6 GHz |
| Reference numerology | [1] | [1] |
| Bandwidth for DL common channel, and SS block position | [3] | [2] |
| # of OFDM symbols in a Slot | [1] | 0 |
| CORESET (Frequency resource - bandwidth, location) (Time resource - starting OFDM symbol, Duration) (UE Monitoring Periodicity, offset, duration) | About [10] | About [10] |
| Total | About [14] | |

(4) Measurement Result

Figure 36:
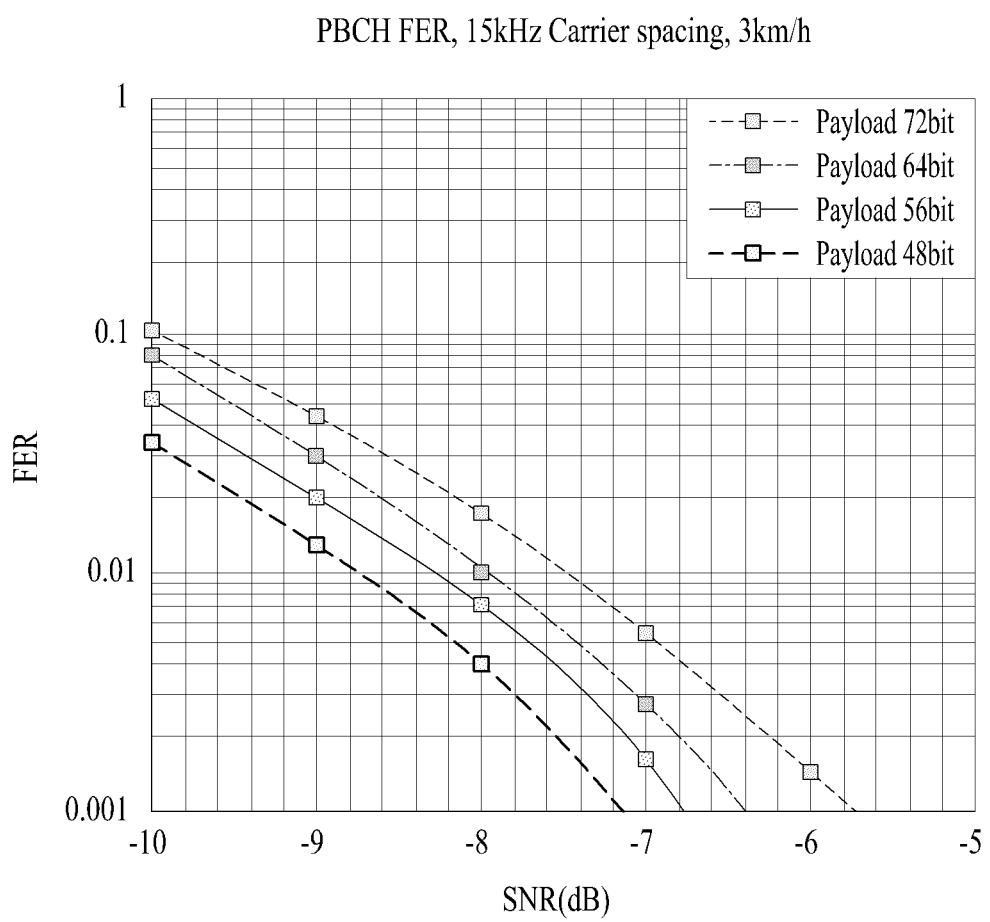

With reference to FIG. 36, performance results according to payload sizes (i.e., 48, 56, 64, and 72 bits) will be described. Herein, it is assumed that 384 REs and 192 REs are used for DMRSs.

It may be noted from FIG. 36 that if the payload size is up to 72 bits, performance requirements for the NR-PBCH (i.e., 1% BLER at an SNR of −6 dB) may be satisfied by using 384 REs for data and 192 REs for DMRSs.

Figure 37:
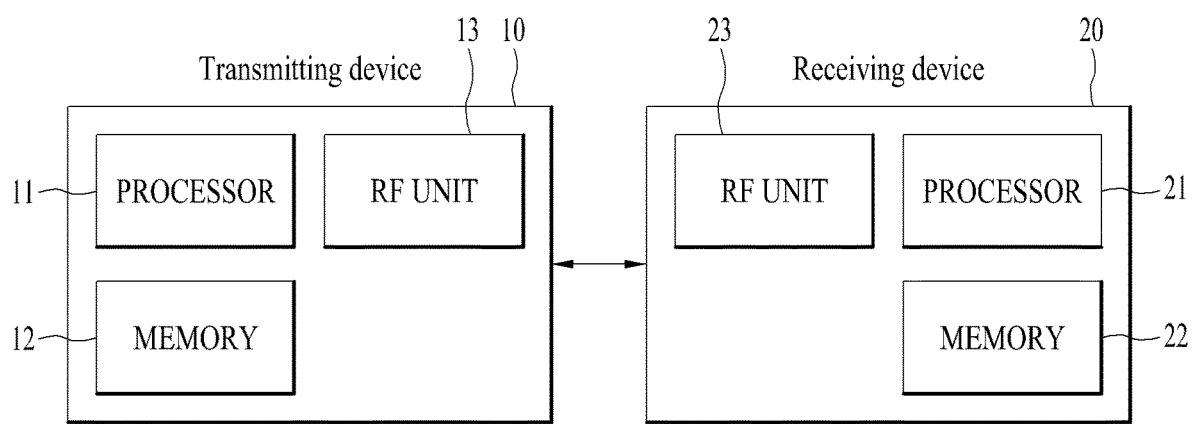
FIG. 37 is a block diagram illustrating components of a transmission apparatus 10 and a reception apparatus 20, for implementing the present disclosure.

FIG. 37 is a block diagram illustrating components of a transmitting device 10 and a receiving device 20 which implement the present disclosure.

The transmitting device 10 and the receiving device 20, respectively include radio frequency (RF) units 13 and 23 which transmit or receive radio signals carrying information/ and or data, signals, and messages, memories 12 and 22 which store various types of information related to communication in a wireless communication system, and processors 11 and 21 which are operatively coupled with components such as the RF units 13 and 23 and the memories 12 and 22, and control the memories 12 and 22 and/or the RF units 13 and 23 to perform at least one of the foregoing embodiments of the present disclosure.

The memories 12 and 22 may store programs for processing and control of the processors 11 and 21, and temporarily store input/output information. The memories 12 and 22 may be used as buffers.

The processors 11 and 21 generally provide overall control to the operations of various modules in the transmitting device or the receiving device. Particularly, the processors 11 and 21 may execute various control functions to implement the present disclosure. The processors 11 and 21 may be called controllers, microcontrollers, microprocessors, microcomputers, and so on. The processors 11 and 21 may be achieved by various means, for example, hardware, firmware, software, or a combination thereof. In a hardware configuration, the processors 11 and 21 may be provided with application specific integrated circuits (ASICs), digital signal processors (DSPs), digital signal processing devices (DSPDs), programmable logic devices (PLDs), field programmable gate arrays (FPGAs), etc. In a firmware or software configuration, firmware or software may be configured to include a module, a procedure, a function, or the like. The firmware or software configured to implement the present disclosure may be provided in the processors 11 and 21, or may be stored in the memories 12 and 22 and executed by the processors 11 and 21.

The processor 11 of the transmitting device 10 performs a predetermined coding and modulation on a signal and/or data which is scheduled by the processor 11 or a scheduler connected to the processor 11 and will be transmitted to the outside, and then transmits the encoded and modulated signal and/or data to the RF unit 13. For example, the processor 11 converts a transmission data stream to K layers after demultiplexing, channel encoding, scrambling, modulation, and so on. The encoded data stream is referred to as a codeword, equivalent to a data block provided by the MAC layer, that is, a transport block (TB). One TB is encoded to one codeword, and each codeword is transmitted in the form of one or more layers to the receiving device. For frequency upconversion, the RF unit 13 may include an oscillator. The RF unit 13 may include $N_t$ transmission antennas ($N_t$ is a positive integer equal to or greater than 1).

The signal process of the receiving device 20 is configured to be reverse to the signal process of the transmitting device 10. The RF unit 23 of the receiving device 20 receives a radio signal from the transmitting device 10 under the control of the processor 21. The RF unit 23 may include $N_r$ reception antennas, and recovers a signal received through each of the reception antennas to a baseband signal by frequency downconversion. For the frequency downconversion, the RF unit 23 may include an oscillator. The processor 21 may recover the original data that the transmitting device 10 intends to transmit by decoding and demodulating radio signals received through the reception antennas.

Each of the RF units 13 and 23 may include one or more antennas. The antennas transmit signals processed by the RF units 13 and 23 to the outside, or receive radio signals from the outside and provide the received radio signals to the RF units 13 and 23 under the control of the processors 11 and 21 according to an embodiment of the present disclosure. An antenna may also be called an antenna port. Each antenna may correspond to one physical antenna or may be configured to be a combination of two or more physical antenna elements. A signal transmitted from each antenna may not be further decomposed by the receiving device 20. An RS transmitted in correspondence with a corresponding antenna defines an antenna viewed from the side of the receiving device 20, and enables the receiving device 20 to perform channel estimation for the antenna, irrespective of whether a channel is a single radio channel from one physical antenna or a composite channel from a plurality of physical antenna elements including the antenna. That is, the antenna is defined such that a channel carrying a symbol on the antenna may be derived from the channel carrying another symbol on the same antenna. In the case of an RF unit supporting MIMO in which data is transmitted and received through a plurality of antennas, the RF unit may be connected to two or more antennas.

In the present disclosure, the RF units 13 and 23 may support reception BF and transmission BF. For example, the RF units 13 and 23 may be configured to perform the exemplary functions described before with reference to FIGS. 5 to 8 in the present disclosure. In addition, the RF units 13 and 23 may be referred to as transceivers.

In embodiments of the disclosure, a UE operates as the transmitting device 10 on UL, and as the receiving device 20 on DL. In the embodiments of the disclosure, the gNB operates as the receiving device 20 on UL, and as the transmitting device 10 on DL. Hereinafter, a processor, an RF unit, and a memory in a UE are referred to as a UE processor, a UE RF unit, and a UE memory, respectively, and a processor, an RF unit, and a memory in a gNB are referred to as a gNB processor, a gNB RF unit, and a gNB memory, respectively.

In the present disclosure, the gNB processor controls transmission of an SSB including a PSS/SSS/PBCH to a UE. A subcarrier spacing to be applied to a DL common channel is indicated by a 1-bit indicator in an MIB transmitted on the PBCH. The 1-bit indicator indicates that the subcarrier spacing is 15 kHz or 30 kHz in a band below 6 GHz, and 60 kHz or 120 kHz in a band above 6 GHz. Further, the subcarrier spacing indicated by the 1-bit indicator is applied commonly to transmission of RMSI, OSI, and MSg 2/4.

In the present disclosure, the UE processor controls reception of an SSB including a PSS/SSS/PBCH from a gNB. The UE processor receives a subcarrier spacing for a DL common channel by a 1-bit indicator in an MIB of the PBCH. The 1-bit indicator indicates that the subcarrier spacing is 15 kHz or 30 kHz in a band below 6 GHz, and 60 kHz or 120 kHz in a band above 6 GHz. Further, the subcarrier spacing indicated by the 1-bit indicator is applied commonly to reception of RMSI, OSI, and MSg 2/4.

The gNB processor or the UE processor of the present disclosure may be configured to implement the present disclosure in a cell operating in a high frequency band at or above 6 GHz in which analog BF or hybrid BF is used.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the above-described method and apparatus for transmitting and receiving a DL channel have been described in the context of the 5G New RAT system, the method and apparatus are also applicable to various other wireless communication systems than the 5G New RAT system.

The invention claimed is:

1. A method for receiving a downlink (DL) common channel (CCH) by a user equipment (UE) operating in a frequency band in a wireless communication system, the method comprising:
  receiving a synchronization signal block (SSB) including a primary synchronization signal (PSS), a secondary synchronization signal (SSS), and a physical broadcasting channel (PBCH);
  determining a subcarrier spacing for the DL CCH based on 1 bit information obtained via the PBCH; and
  receiving the DL CCH based on the subcarrier spacing,
  wherein the subcarrier spacing is determined differently based on the frequency band,
  wherein the DL CCH is for remaining minimum system information (RMSI) and DL messages for a random access, and
  wherein first information related to a frequency resource configuration for the DL CCH, second information related to a time resource configuration of a symbol duration for the DL CCH and third information related to monitoring of a common search space for the DL CCH are configured in the PBCH.

2. The method according to claim 1, wherein based on the frequency band exceeding a specific value, the subcarrier spacing is determined as 60 kHz or 120 kHz.

3. The method according to claim 1, wherein based on the frequency band being below a specific value, the subcarrier spacing is determined as 15 kHz or 30 kHz.

4. The method according to claim 1, wherein the 1 bit information is obtained independently from information related to a subcarrier spacing for a DL channel except for the DL CCH.

5. The method according to claim 1, wherein a subcarrier spacing for the RMSI and a subcarrier spacing for the DL messages for the random access are same.

6. A communication apparatus configured to operate in a frequency band for receiving a downlink (DL) common channel (CCH) in a wireless communication system, the communication apparatus comprising:
  a memory; and
  a processor coupled to the memory and configured to:
  receive a synchronization signal block (SSB) including a primary synchronization signal (PSS), a secondary synchronization signal (SSS), and a physical broadcasting channel (PBCH),
  determine a subcarrier spacing for the DL CCH based on 1 bit information obtained via the PBCH, and
  receive the DL CCH based on the subcarrier spacing,
  wherein the subcarrier spacing is determined differently based on the frequency band,
  wherein the DL CCH is for remaining minimum system information (RMSI) and DL messages for a random access, and
  wherein first information related to a frequency resource configuration for the DL CCH, second information related to a time resource configuration of a symbol duration for the DL CCH and third information related to monitoring of a common search space for the DL CCH are configured in the PBCH.

7. The communication apparatus according to claim 6, wherein based on the frequency band exceeding a specific value, the subcarrier spacing is determined as 60 kHz or 120 kHz.

8. The communication apparatus according to claim 6, wherein based on the frequency band being below a specific value, the subcarrier spacing is determined as 15 kHz or 30 kHz.

9. The communication apparatus according to claim 6, wherein the 1 bit information is obtained independently from information related to a subcarrier spacing for a DL channel except for the DL CCH.

10. The communication apparatus according to claim 6, wherein a subcarrier spacing for the RMSI and a subcarrier spacing for the DL messages for the random access are same.

11. A method for transmitting a downlink (DL) common channel (CCH) by a base station (BS) supporting a frequency band in a wireless communication system, the method comprising:
  transmitting a synchronization signal block (SSB) including a primary synchronization signal (PSS), a secondary synchronization signal (SSS), and a physical broadcasting channel (PBCH), wherein the PBCH includes 1 bit information related to a subcarrier spacing for the DL CCH; and
  transmitting the DL CCH based on the 1 bit information,
  wherein the subcarrier spacing is determined differently based on the frequency band,
  wherein the DL CCH is for remaining minimum system information (RMSI) and DL messages for a random access, and
  wherein first information related to a frequency resource configuration for the DL CCH, second information related to a time resource configuration of a symbol duration for the DL CCH and third information related to monitoring of a common search space for the DL CCH are configured in the PBCH.

12. A communication apparatus supporting a frequency band for transmitting a downlink (DL) common channel (CCH) in a wireless communication system, the communication apparatus comprising:
  a memory; and
  a processor coupled to the memory and configured to:
  transmit a synchronization signal block (SSB) including a primary synchronization signal (PSS), a secondary synchronization signal (SSS), and a physical broadcasting channel (PBCH),
  wherein the PBCH includes 1 bit information related to a subcarrier spacing for the DL CCH, and transmit the DL CCH based on 1 bit information,
  wherein the subcarrier spacing is determined differently based on the frequency band,
  wherein the DL CCH is for remaining minimum system information (RMSI) and DL messages for a random access, and wherein first information related to a frequency resource configuration for the DL CCH, second information related to a time resource configuration of a symbol duration for the DL CCH and third information related to monitoring of a common search space for the DL CCH are configured in the PBCH.

* * * * *